United States Patent
Lai

(10) Patent No.: US 12,532,989 B2
(45) Date of Patent: Jan. 27, 2026

(54) HANDHELD FOOD BLENDER WITH MULTIPLE ATTACHMENTS

(71) Applicant: CONAIR LLC, Stamford, CT (US)

(72) Inventor: Kin Man Lai, Hong Kong (CN)

(73) Assignee: Conair LLC, Stamford, CT (US)

( * ) Notice: Subject to any disclaimer, the term of this patent is extended or adjusted under 35 U.S.C. 154(b) by 737 days.

(21) Appl. No.: 17/694,763

(22) Filed: Mar. 15, 2022

(65) Prior Publication Data

US 2023/0292959 A1 Sep. 21, 2023

(51) Int. Cl.
*A47J 43/06* (2006.01)
*A47J 43/044* (2006.01)
*A47J 43/07* (2006.01)

(52) U.S. Cl.
CPC ............. *A47J 43/06* (2013.01); *A47J 43/044* (2013.01); *A47J 43/0711* (2013.01); *A47J 2043/04427* (2013.01)

(58) Field of Classification Search
CPC .......................... A47J 2043/04427; A47J 43/06
USPC ........................................................... 366/129
See application file for complete search history.

(56) References Cited

U.S. PATENT DOCUMENTS

| 1,882,127 A | 10/1932 | Emmons |
| 7,172,334 B2 | 2/2007 | Chiappetta |
| 11,963,637 B2 * | 4/2024 | Staun ...................... A47J 44/00 |
| 2018/0116464 A1 * | 5/2018 | Wolf ...................... B01F 27/171 |
| 2018/0178367 A1 * | 6/2018 | Benson ................. A47J 43/044 |
| 2023/0276993 A1 * | 9/2023 | Aditjandra ............ A47J 43/044 366/129 |
| 2024/0164582 A1 * | 5/2024 | Deng .................... A47J 43/044 |

FOREIGN PATENT DOCUMENTS

| CN | 1393199 A | 1/2003 |
| WO | WO2010/122285 A2 | 10/2010 |

OTHER PUBLICATIONS

Corresponding PCT International Application No. PCT/US2023/013567 International Search Report and Written Opinion dated Jul. 25, 2023.
Extended European Search Report for European Application No. 23771216, mailed Apr. 15, 2025, 10 pages.

* cited by examiner

*Primary Examiner* — David L Sorkin
(74) *Attorney, Agent, or Firm* — Grogan, Tuccillo & Vanderleeden, LLP

(57) ABSTRACT

A handheld food blender includes a main body configured to house a motor, a drive shaft assembly removably connected to the main body, the drive shaft assembly having a transmission shaft configured to be driven by the motor, and a processing tool attachment removably connected to a distal end of the drive shaft assembly, the processing tool attachment having a food processing implement and a drive shaft. The transmission shaft is configured to transmit a rotational output of the motor to the drive shaft of the processing tool attachment to rotate the food processing implement.

9 Claims, 31 Drawing Sheets

HANDHELD FOOD BLENDER WITH MULTIPLE ATTACHMENTS

FIELD OF THE INVENTION

The present invention relates to blenders and, more particularly, to handheld blenders have multiple removable attachments.

BACKGROUND OF THE INVENTION

Handheld blenders, including immersion blenders, are well known. Typically, these blenders have a tall, tubular hand grip portion that contains a drive motor, to which a shaft that may be immersed into a liquid or mixture is connected. The shaft typically has an input end operatively connected to the drive motor and an output end operatively connected to a processing tool, such as, for example, a whisk attachment (good for whipping cream), and other accoutrements, such as strainers or beakers, to puree or chop or otherwise mix the contents of individual drinks or the like.

These handheld blenders are very practical for their specific purpose. Conventionally, such blenders are used in combination with any of a variety of separate containers to process (e.g., mix, chop, cut, etc.) any of a variety of different food stuffs of various consistencies from solid to viscous to liquid.

These handheld, immersion blenders, also sometimes referred to as stick blenders, thus have various processing tools that each have an integral drive shaft. Accordingly, each respective processing tool can be selectively connected to the drive motor by connecting the input end of the shaft to the drive motor. Removal of the processing tool can, conversely, be accomplished by decoupling the input end of the shaft from the drive motor.

While existing handheld blender devices are generally suitable for what is regarded as ordinary performance, the use of a dedicated drive shaft for each processing tool or implement results in a fairly large and cumbersome array of attachments. This design also contributes to a greater cost for each attachment/processing tool, as each processing tool is configured with its own drive shaft.

In view of the above, there is a need for a handheld food blender having an improved drive shaft assembly and locking mechanism which obviates the need for the various processing tools to each have its own, integral drive shaft. There is also a need for improvement in the overall design and operation of various processing tools for use with a handheld food blender.

SUMMARY OF THE INVENTION

It is an object of the present invention to provide a handheld food blender having multiple processing tool attachments.

It is another object of the present invention to provide a hand held blender that ensures a reliable and stable connection between a transmission shaft and a drive motor.

It is still another object of the present invention to provide a hand held blender that provides that the connection between a transmission shaft and a drive motor is quickly and easily releasable via a user interaction.

It is another object of the present invention to provide a handheld food blender having multiple processing tool attachments that can be selectively removed from the handheld food blender without removal of the transmission shaft.

It is another object of the present invention to provide a potato masher attachment for a handheld food blender.

It is another object of the present invention to provide a whisk attachment for a handheld food blender.

These and other objects are achieved by the present invention.

According to an embodiment of the present invention, a handheld food blender includes a main body configured to house a motor, a drive shaft assembly removably connected to the main body, the drive shaft assembly having a transmission shaft configured to be driven by the motor, and a processing tool attachment removably connected to a distal end of the drive shaft assembly, the processing tool attachment having a food processing implement and a drive shaft. The transmission shaft is configured to transmit a rotational output of the motor to the drive shaft of the processing tool attachment to rotate the food processing implement.

According to another embodiment of the present invention, a method of processing a food item includes the steps of removably connecting a drive shaft assembly to a main body having a motor such that a transmission shaft of the drive shaft assembly can be driven by the motor, and removably connecting a processing tool attachment to a distal end of the drive shaft assembly in such a manner such that an output of the motor can be transmitted to a food processing implement of the processing tool attachment.

According to yet another embodiment of the present invention, a handheld food blender includes a main body portion defining a housing, an electric motor within the main body portion and configured to produce a rotational output, a drive shaft assembly removably coupled to the main body portion, the drive shaft assembly having an elongate housing and a transmission shaft received within the housing and being configured to be driven by the motor, the drive shaft further including an annular flange at a distal end thereof, and a plurality of lugs depending from the annular flange, and a processing tool attachment removably connected to a distal end of the drive shaft assembly, the processing tool attachment having a food processing implement and a drive shaft, and a plurality of keyhole openings configure to receive the plurality of lugs. The transmission shaft is configured to transmit the rotational output of the motor to the drive shaft of the processing tool attachment to rotate the food processing implement.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
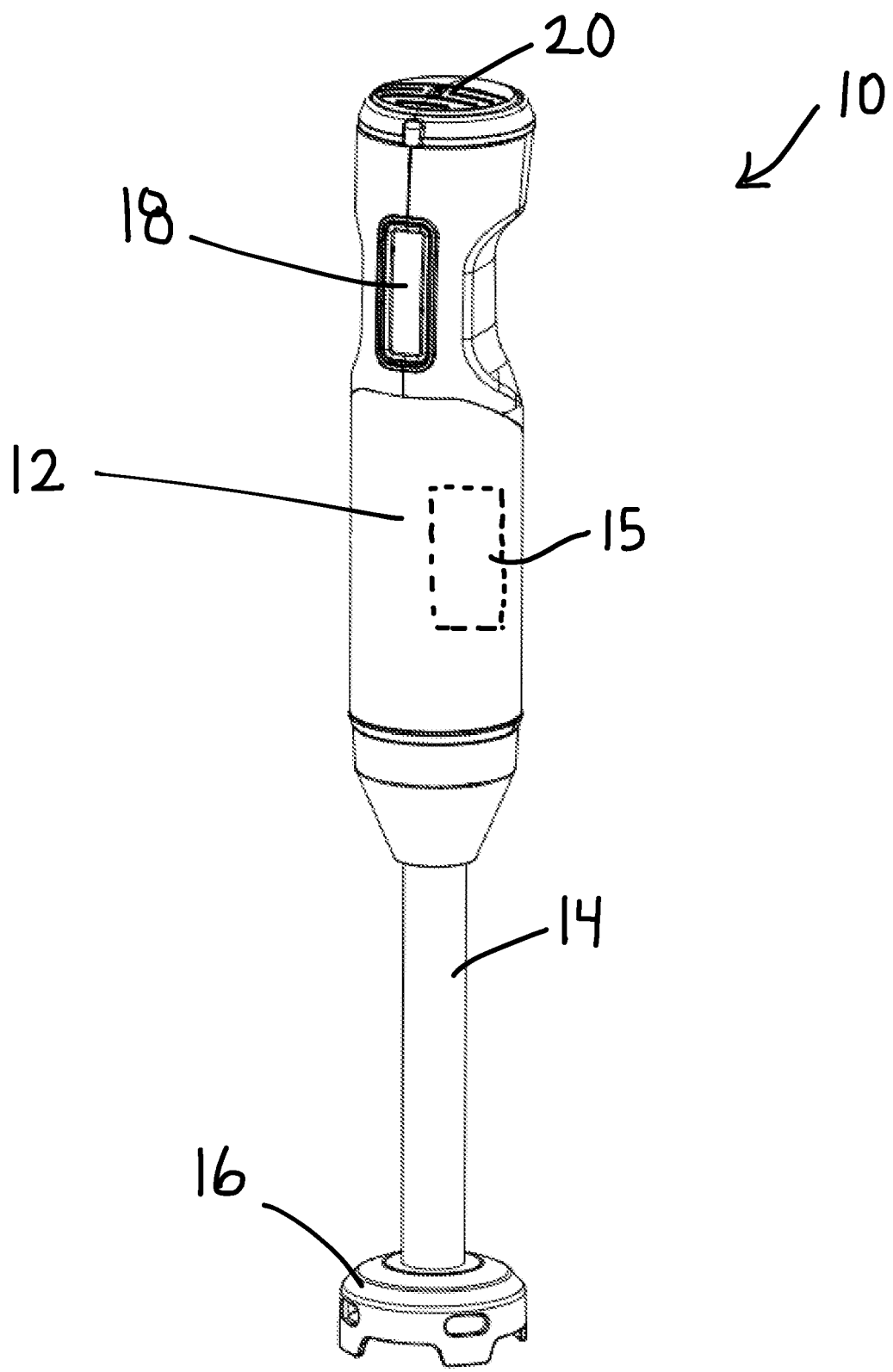
FIG. 1 is a perspective view of a handheld food blender, according to an embodiment of the present invention.
Figure 2:
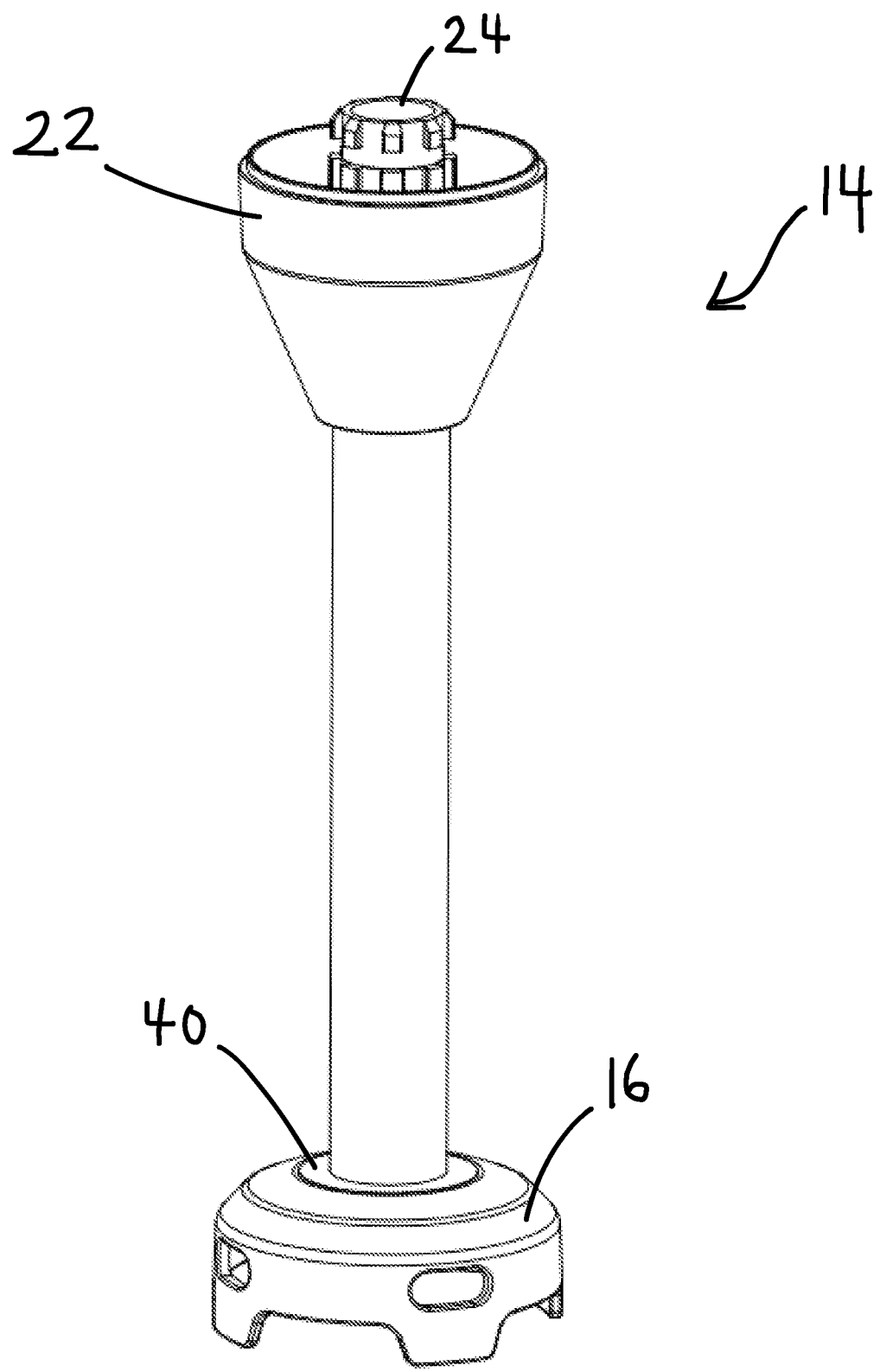
FIG. 2 is a perspective view of a removable drive shaft assembly and processing tool attachment of the handheld food blender of FIG. 1.
Figure 3:
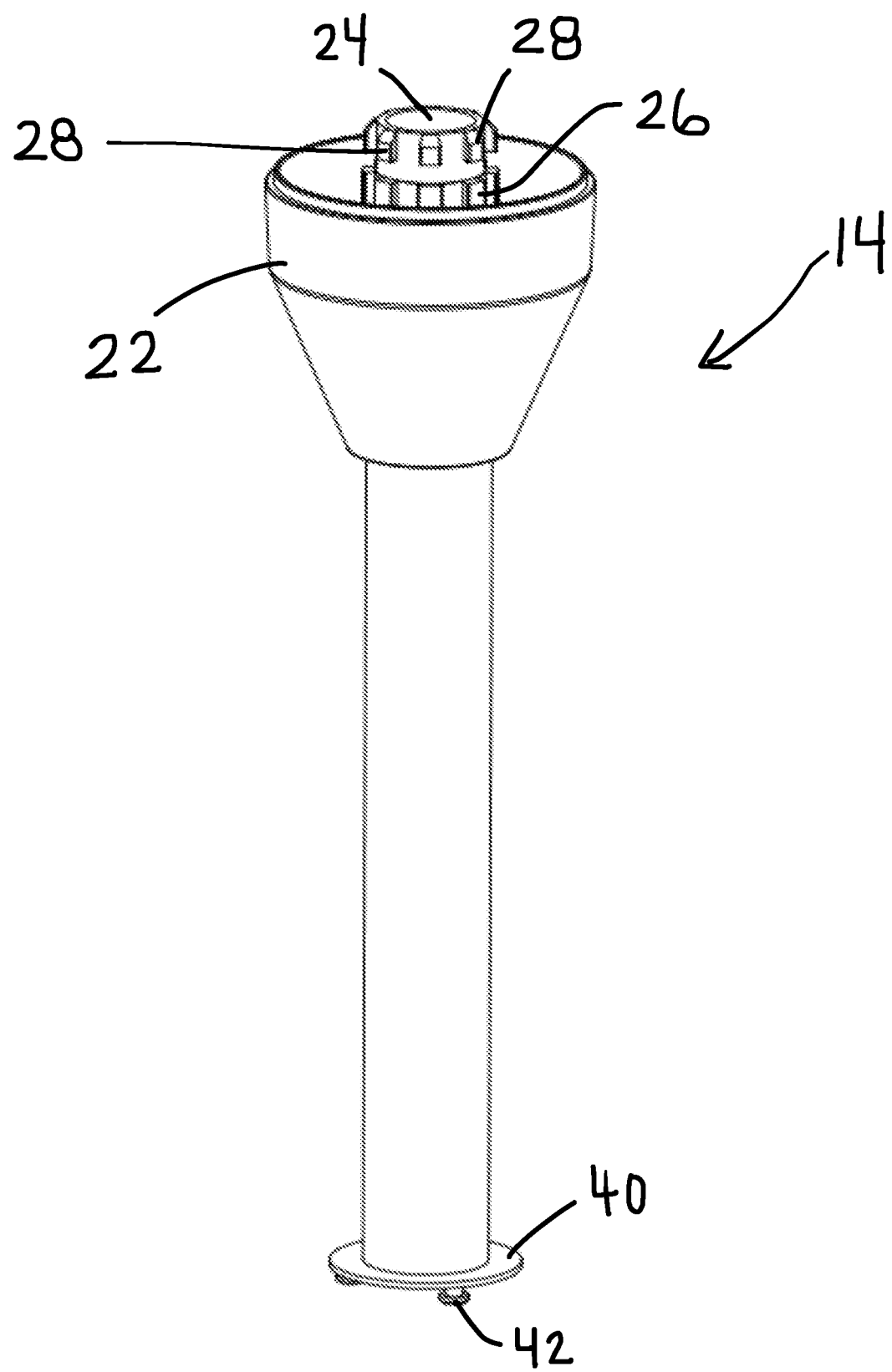
FIG. 3 is a perspective view of the removable drive shaft assembly of the handheld food blender.

Referring to FIG. 1, a handheld blender 10 according to an embodiment of the present invention is illustrated. The blender 10 includes a main body portion 12 shaped and/or configured for handling by an operator and for housing a drive motor (15, a drive shaft assembly 14 having a proximal end removably connected to the main body portion 12, and a processing tool attachment 16 removably connected to a distal end of the drive shaft assembly 14. It is contemplated that the main body portion 12 may also accommodate one or more batteries (not shown) for powering the motor, or may have a power cable (not shown) for connection to an external supply of electrical power for powering the motor. In an embodiment, the main body portion 12 is cylindrically shaped for ergonomic gripping by a user, however, other shapes and/or configurations are possible without departing from the broader aspects of the invention.

Still further, in an embodiment, the main body portion 12 may accommodate a cooling system (e.g., a fan), an on/off switch or button 18 for actuating or stopping the motor, one or more controls (not shown) for controlling a speed of the motor, and an unlock button 20 located on a proximal end of the main body portion for decoupling the drive shaft assembly 14 from the main body portion 12.

Figure 6:
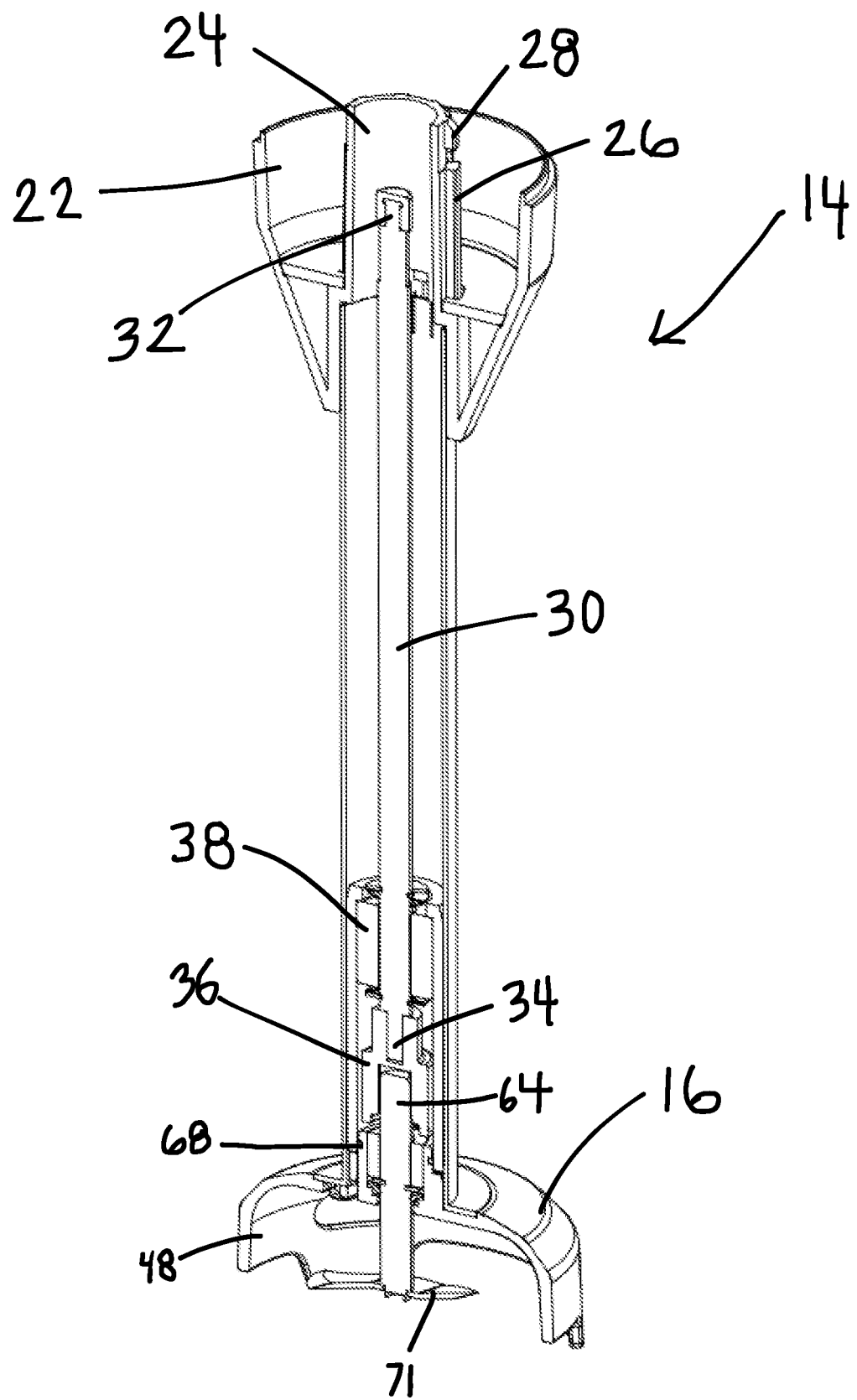
FIG. 6 is a perspective, cross-sectional view of the drive shaft assembly having a processing tool attachment connected thereto.
Figure 8:
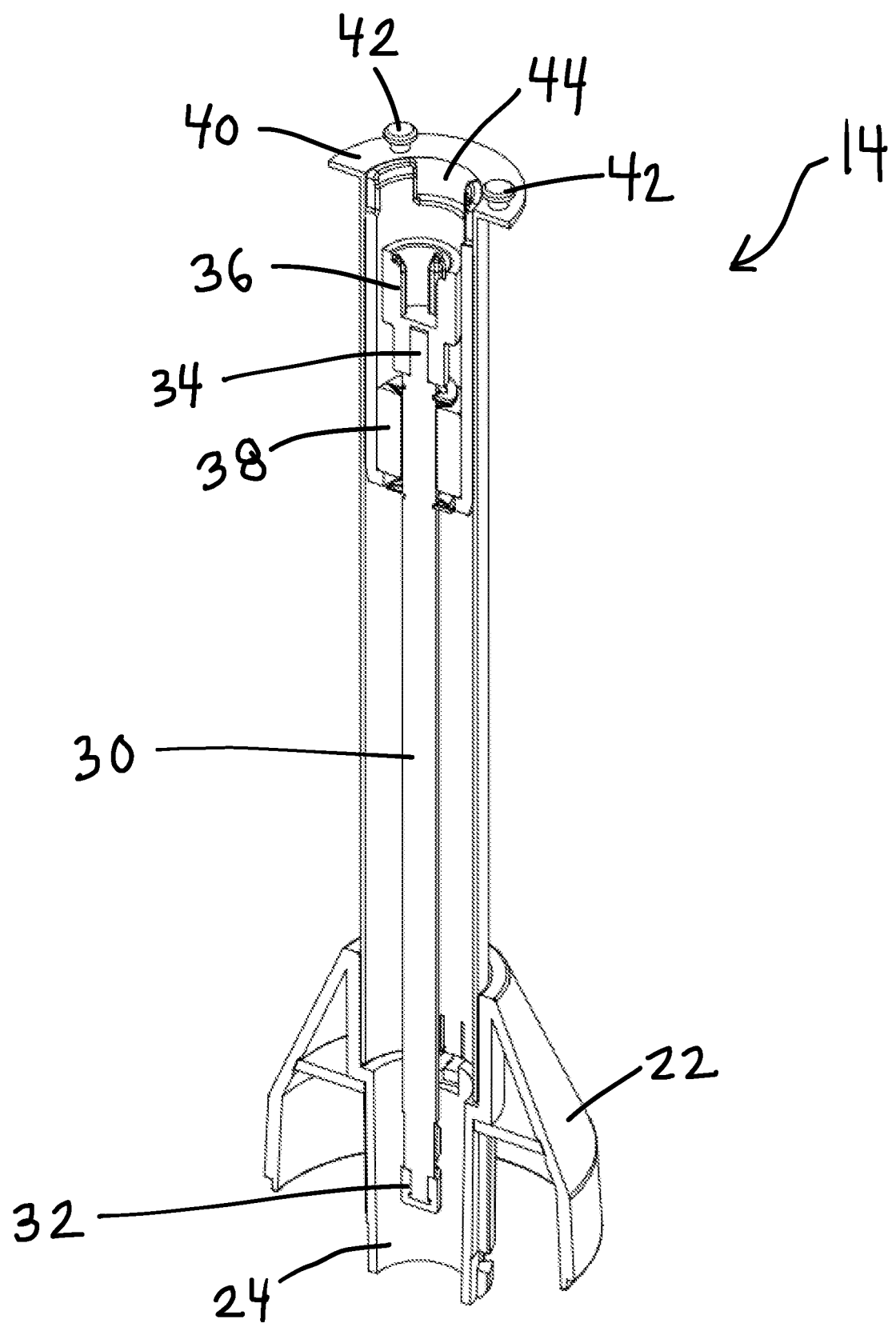
FIG. 8 is a bottom, perspective, cross-sectional view of the drive shaft assembly having a processing tool attachment connected thereto.

As best shown in FIGS. 2, 3, 5, 6 and 8 the drive shaft assembly 14 includes an outer, conical shroud 22 configured to form a seal with the main body portion 12, and a hollow, elongate housing member 24 extending from the proximal end of the drive shaft assembly 14 to the distal end. In an embodiment, the proximal end of the elongate housing member has a plurality of parallel ribs 26 and protrusions 28 on an external surface thereof. The ribs 26 and protrusions 28 are configured to be received in corresponding grooves in the main body portion 12, for releasably connecting the drive shaft assembly 14 to the main body portion 12. As best shown in FIGS. 6 and 8, the drive shaft assembly 14 further includes a drive or transmission shaft 30 extending through the hollow housing member 24, and having a proximal end 32 configured for connection to a drive shaft of the motor in a manner so as to be rotationally driven thereby. In an embodiment, the drive shaft of the motor and the transmission shaft 30 may be interconnected in any of a variety of conventional ways. For example, the drive shaft of the motor and the transmission shaft 30 (and the main body 12 and the drive shaft assembly 14) may be releasably connected in the manner disclosed in U.S. Pat. No. 7,172,334, the disclose of which is hereby incorporated by reference herein in its entirety. which is incorporated. In an embodiment, the unlock button is operable to enable detachment of the drive shaft assembly 14 from the main body 12 (and the transmission shaft 30 from the motor).

As further shown in FIGS. 6 and 8, the distal end 34 of the transmission shaft 30 is outfitted with a coupling member 36, the purpose of which will be described hereinafter. A bushing 38 is received around the transmission shaft 30 adjacent its distal end 34 for supporting the shaft 30 and centering the shaft 30 within the elongate housing member 24.

Figure 7:
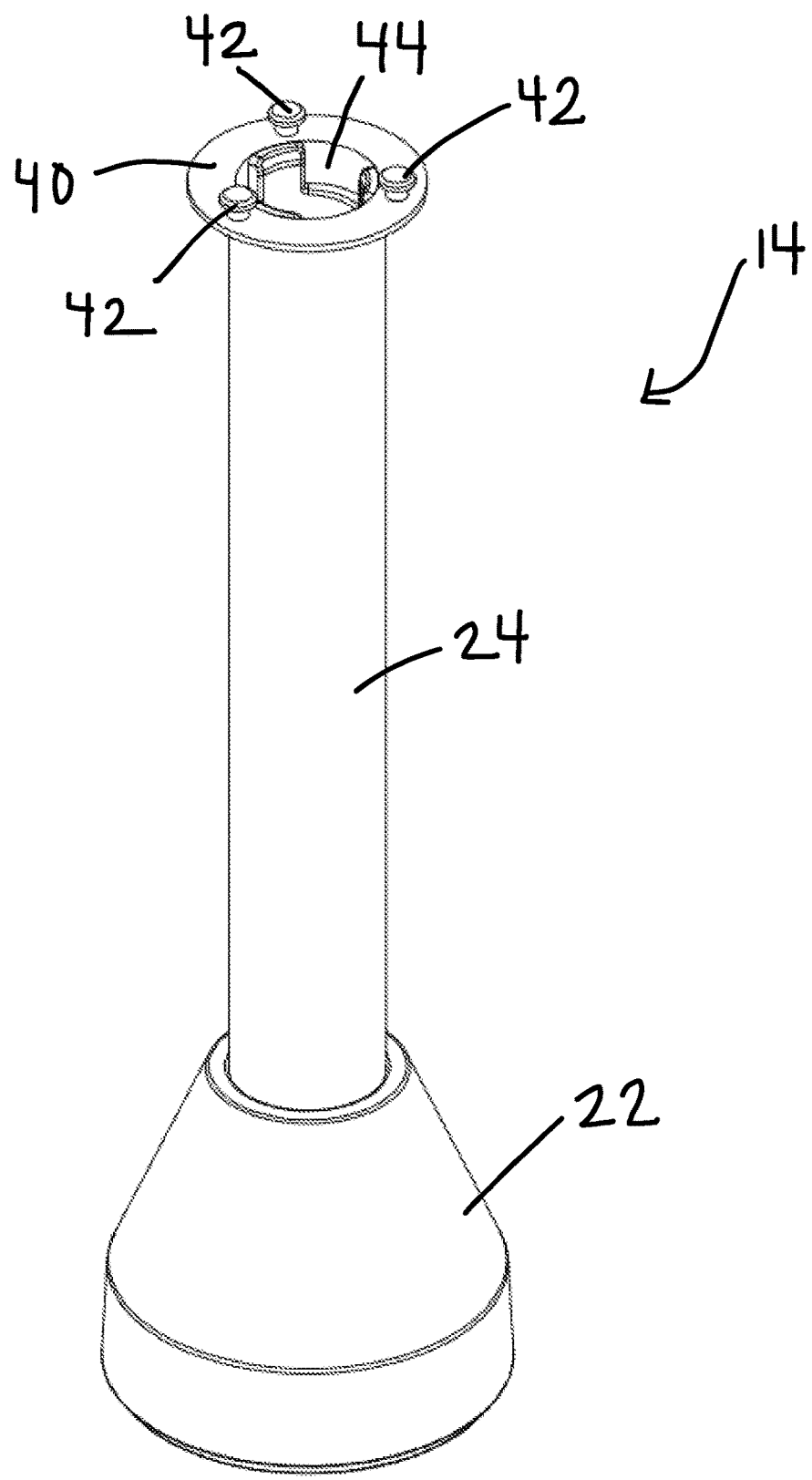
FIG. 7 is a bottom, perspective view of the drive shaft assembly.

Referring to FIGS. 7 and 8, the distal end of the elongate housing member 24 includes an annular flange 40 having a plurality of lugs 42 protruding from an underside thereof. In an embodiment, the plurality of lugs 42 may be three lugs, although fewer than or more than three lugs may be utilized without departing from the broader aspects of the invention. The lugs 42 are preferably configured as posts having a head or flange at a distal end thereof, as illustrated therein. As also shown in FIGS. 7 and 8, the distal end of the elongate housing member 24 includes a plurality of grooves 44 formed in an inner peripheral surface thereof, the purpose of which will be described hereinafter. In an embodiment, the plurality of grooves 44 may be three grooved, although more or fewer than three grooves may also be utilized.

Figure 4:
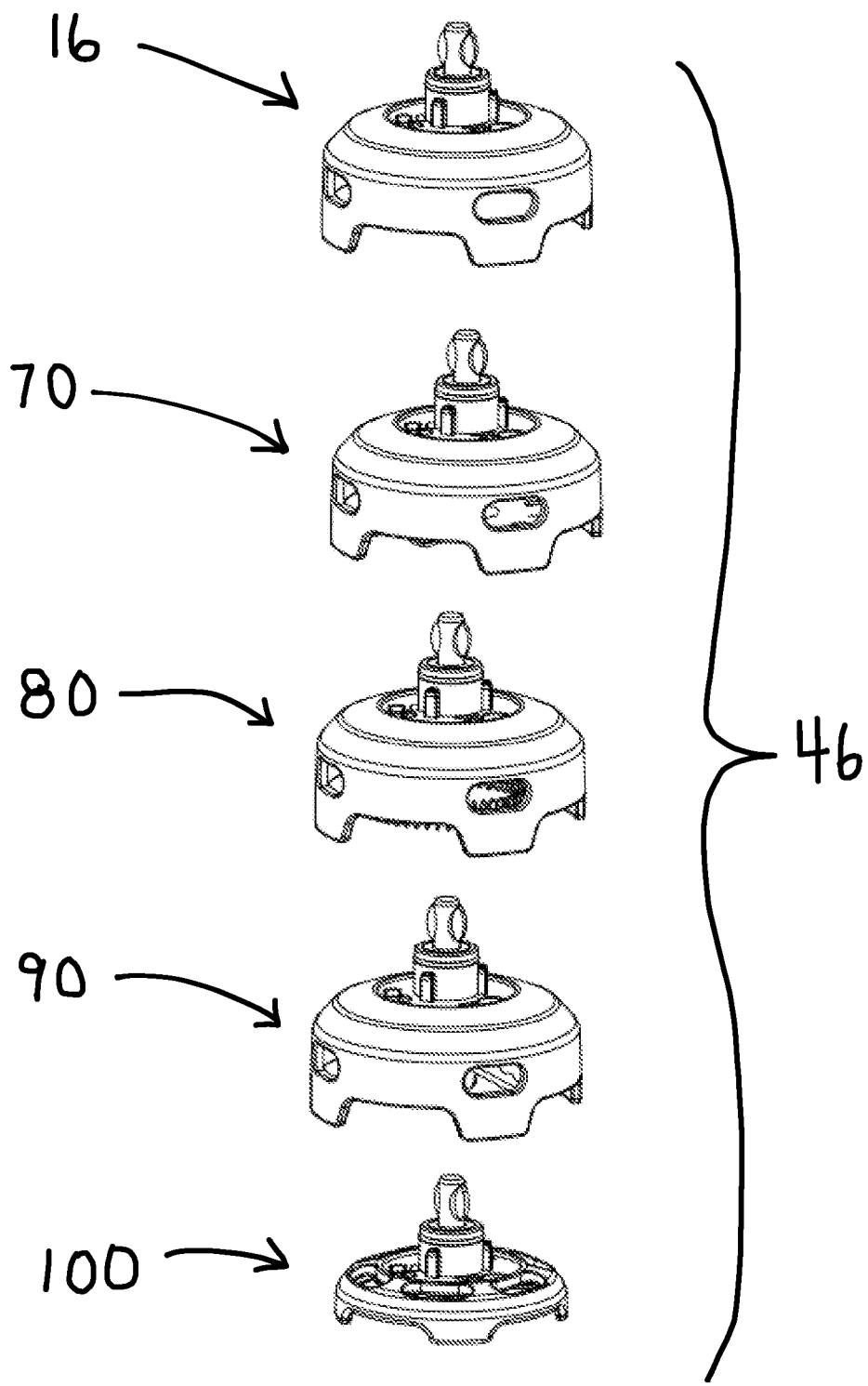
FIG. 4 is a perspective view of an array of processing tool attachments for the handheld food blender of FIG. 1.
Figure 5:
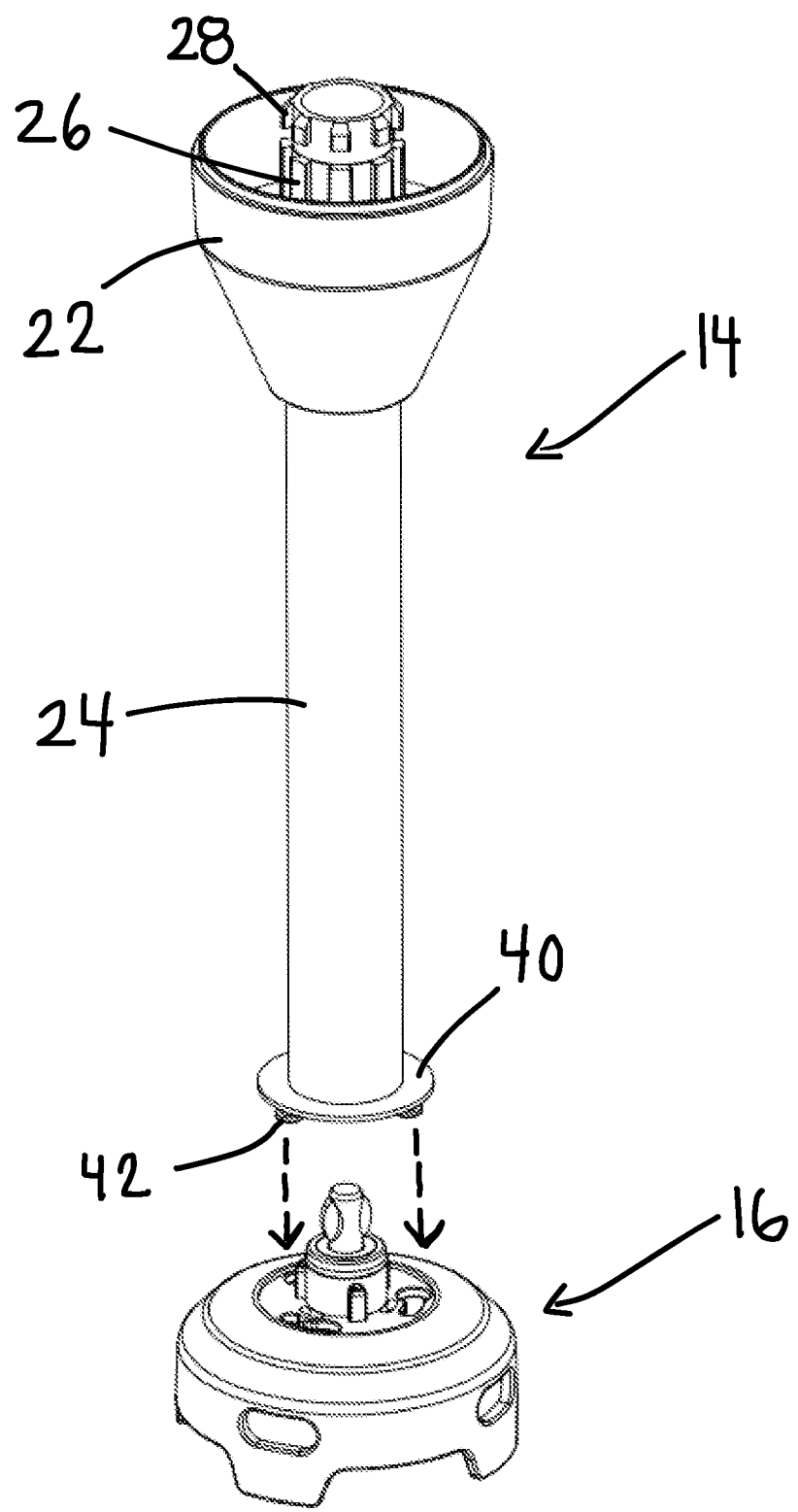
FIG. 5 is a perspective view showing a processing tool attachment removed from the drive shaft assembly.

As indicated above, the handheld blender 10 includes a processing tool attachment 16 removably connected to the distal end of the drive shaft assembly 14. In an embodiment, the processing tool attachment 16 may be configured as an S-blade processing tool attachment. As shown in FIG. 4, however, an array 46 of processing tool attachments may be provided for selective attachment to, and use with, the handheld blender 10. For example, in an embodiment, the processing tool attachments may include the S-blade processing tool attachment 16, a drink disc processing tool attachment 70, a frother processing tool attachment 80, an ice crusher processing tool attachment 90, and a potato masher processing tool attachment 100. Other processing tool attachments for carrying out various other food processing functions are also envisioned.

Each of the processing tool attachments includes an attachment mechanism for removably connecting the processing tool attachments to the drive shaft assembly 14. Such attachment mechanism will now be described with reference to the S-blade processing tool attachment 16 of FIGS. 9, 11 and 13 (with the attachment mechanism of the other processing tool attachments being similarly configured). As shown therein, the processing tool attachment 16 includes a tool guard or shroud 48. A top surface of the shroud 48 includes a plurality of keyhole openings 50 corresponding in number and relative position to the number of lugs 42 (and relative position thereof) on the flange 40 of the drive shaft assembly 14. In an embodiment, the shroud 48 is formed from silicone or plastic, although other materials known in the art may also be utilized without departing from the broader aspects of the present invention.

Figure 11:
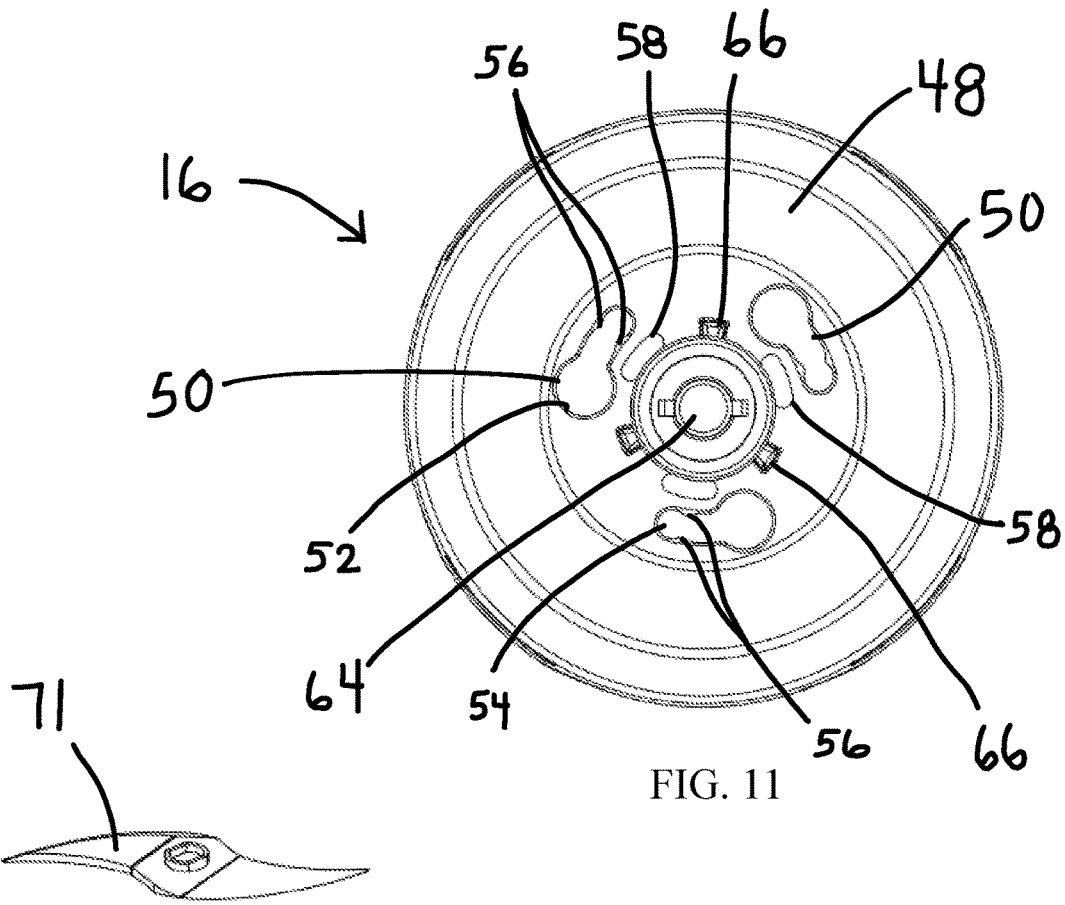
FIG. 11 is a top plan view of the S-blade processing tool attachment of FIG. 9.
Figure 12:
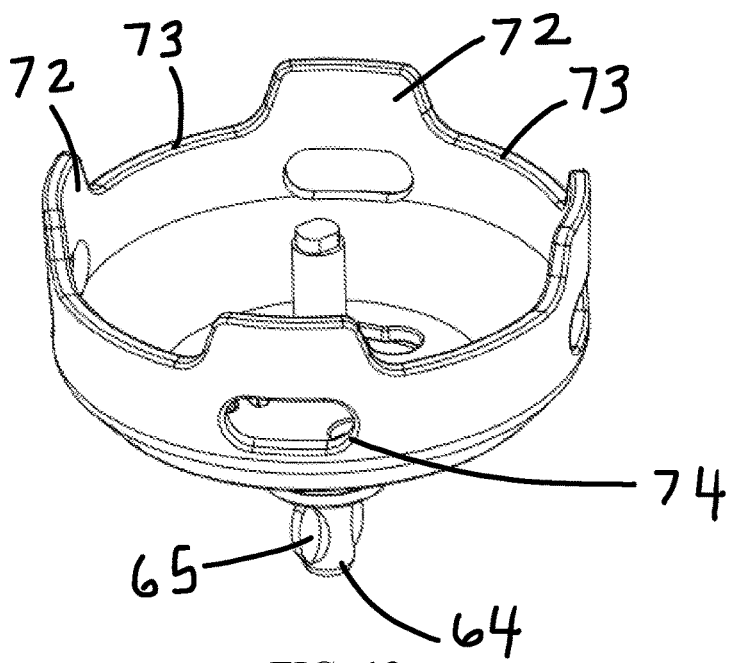
FIG. 12 is an exploded, bottom, perspective view of the S-blade processing tool attachment of FIG. 9.

As best shown in FIG. 11, the keyhole openings 50 each include an enlarged, clearance portion 52, and a narrow, retaining portion 54. The clearance portion 52 has a diameter that is larger than the diameter of the head of the lugs 42, which permits the lugs 42 to be inserted therein, while the retaining portion 54 has a diameter or width that is less than the diameter of the head of the lugs 42, which prevents the lugs from being pulled axially from the keyhole opening 50 when the lugs 42 are received in the narrow, retaining portion 54, as disclosed hereinafter.

Importantly, the area of the keyhole openings adjacent to the narrow, retaining portion 54 includes a pair of opposed convex protrusions 56 (protruding into the slot) defining a reduced width section of the keyhole openings 50. These protrusions 56 function to inhibit the lugs 42 from moving back towards the enlarged, clearance portion 52 when they are received in the narrow, retaining portion 54. Referring still further to FIG. 11, the shroud 48 includes a plurality of relieved areas 58 that impart flexibility in the shroud 48 adjacent to the protrusions 56, which enables the lugs 42 to deform or flex the shroud 48 slightly so that the lugs 42 can pass into the retaining portion 54 of the keyhole openings 50.

Figure 9:
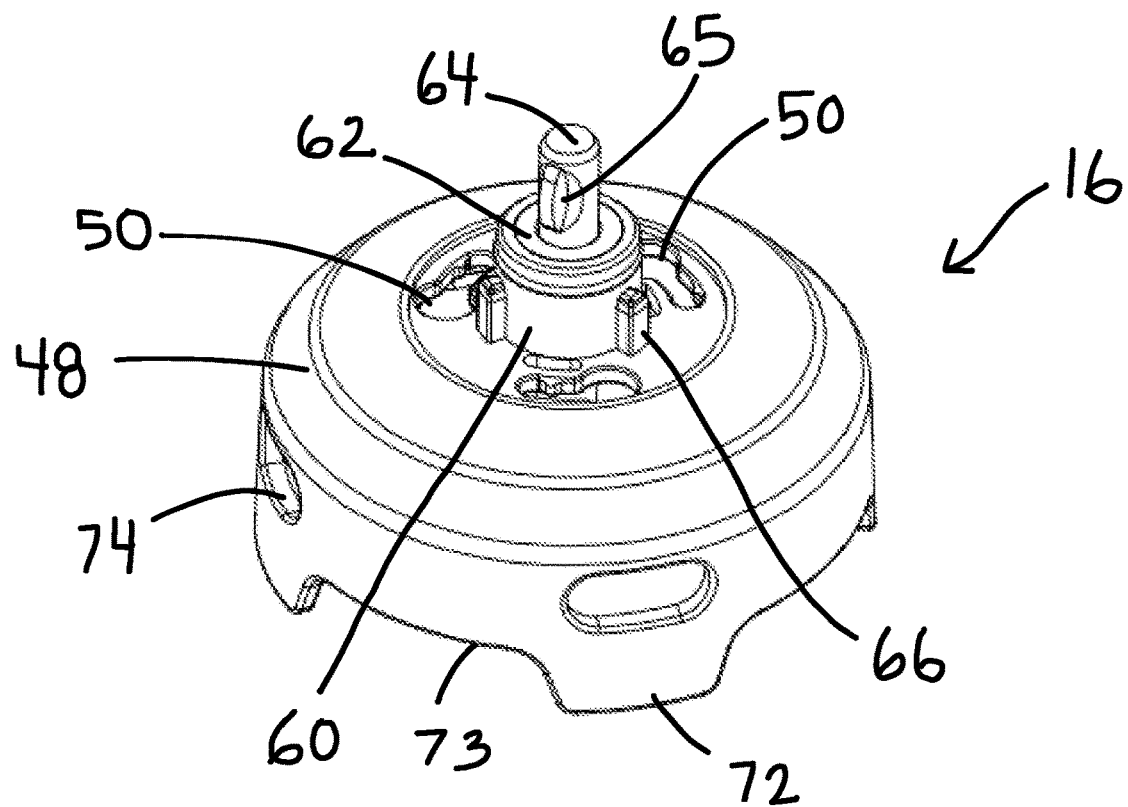
FIG. 9 is a top, perspective view of an S-blade processing tool attachment, according to an embodiment of the present invention.
Figure 10:
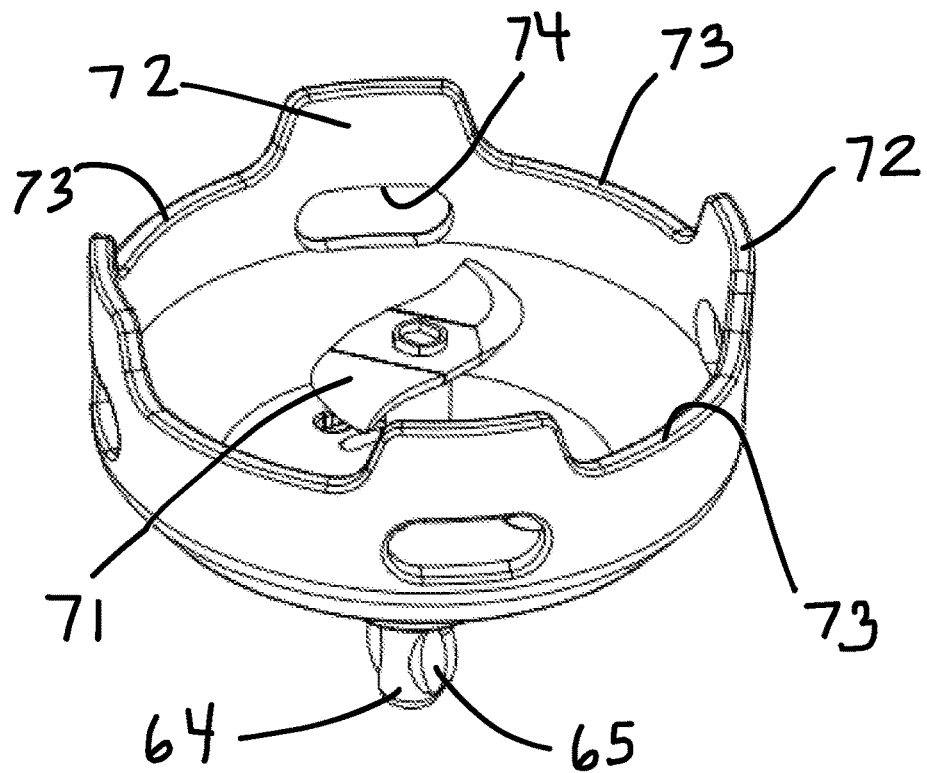
FIG. 10 is a bottom, perspective view of the S-blade processing tool attachment of FIG. 9.
Figure 13:
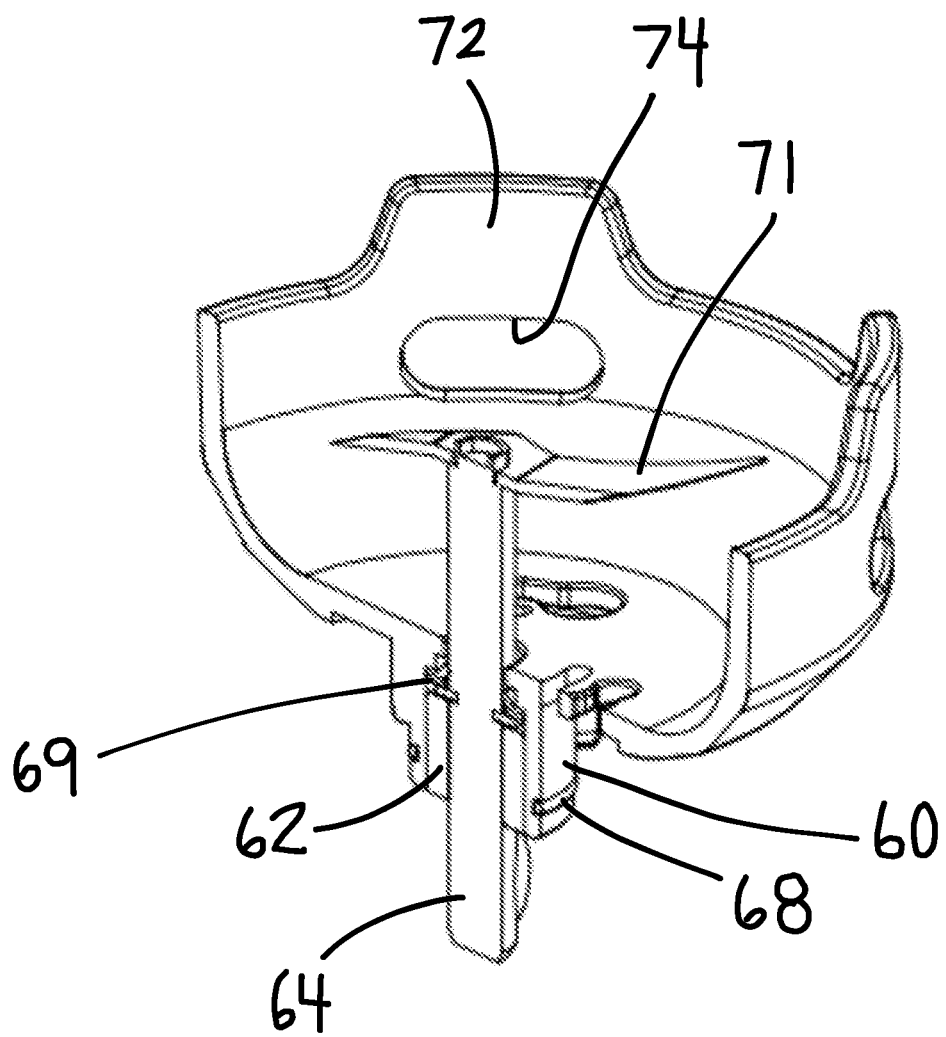
FIG. 13 is a bottom, perspective, cross-sectional view of the S-blade processing tool attachment of FIG. 9.

As also shown in FIGS. 9, 11 and 13, each of the processing tool attachments includes a central hub 60 housing a busing 62 through which a drive shaft 64 of the processing tool attachment passes. The proximal end of the drive shaft 64 includes a pair of opposed paddle elements 65. An exterior peripheral surface of the central hub 62 is configured with a plurality of stops 66 (formed as ribs). The stops 66 are configured to be received in the grooves 44 in the distal end of the elongate housing member 24, for the purpose hereinafter described. As also shown in FIG. 13, the central hub 60 includes a seal ring 68 (e.g., an O-ring) carried thereon for sealing engagement with the inner peripheral surface of the elongate housing member 24. The central hub 60 further includes an internal seal cap 69. In the embodiment of FIGS. 9-13, an S-blade 71 is carried on the distal end of the drive shaft 64 for rotation therewith. The S-blade has sharp edges and is particularly, suitable for blending fruits, vegetables and the like, for making soups, smoothies and the like.

As disclosed above, each of the processing tool attachments 16, 70, 80, 90 and 100 includes the features hereinbefore described (with the exception of the S-blade). With specific respect to the S-blade processing tool attachment 16, the shroud 48 additionally includes a plurality of radially spaced depending legs 72 that form therebetween a plurality of clearance openings 73 in the sidewall of the shroud 48. In an embodiment, an aperture 74 is formed in the sidewall of the shroud 48 above each depending leg 72, which provides for fluid communication between the interior and exterior of the shroud 48.

Referring back to FIGS. 5 and 6, in use, the processing tool attachments 16, 70, 80, 90, 100 can be connected to the distal end of drive shaft assembly 14 by inserting the lugs 42 on the underside of the flange 40 on the distal end of the drive shaft assembly 14 into the enlarged, clearance portions 52 of the corresponding keyhole openings 50 in the top of the shroud 48. In this position, the stops 66 of the central hub 60 are received in the corresponding grooves 44 formed in the inner surface of the drive shaft assembly 14. The drive shaft assembly 14 and the processing tool attachment 16 may then be rotated with respect to one another to move the lugs 42 into the narrower portion of the keyhole openings 50. As the lugs 42 abut the convex protrusions 56 defining the reduced width section of the keyhole openings 50, further relative rotation causes the walls of the keyhole openings 50 to flex (facilitated by the clearance openings 58), allowing the neck of the lugs 42 to pass beyond the convex protrusions 56 and into the reduced diameter retaining portion 54 of the keyhole openings 50. In this position, the convex protrusions 56 inhibit return of the lugs 42 towards the enlarged portion 52 of the keyhole openings 50. Moreover, in this position, the stops 66 on the hub 60 abut the sides of the grooves 44 in the drive shaft assembly 14, to share the working torque with the lugs 42. When received in the reduced diameter portion 54 of the keyhole openings 50, the processing tool attachment 16 is locked to the drive shaft assembly 14 in such a manner that axial movement is unable to decouple such components due to the enlarged head of the lugs 42 being unable to pass through the reduced diameter portion 54 of the keyhole openings 50.

As shown in FIG. 6, in this locked position, the drive shaft 64 of the processing tool attachment 16 is received within the coupling member 36 of the drive shaft assembly 14, and the seal element 68 forms a fluid tight seal with the housing 24. Importantly, the opposing paddle elements 65 on the dive shaft 64 maintain the drive shaft 64 in fixed position with respect to the coupling member 36 so that torque can be transmitted from the motor, through the shaft 30 and coupling member 36 thereof, to the drive shaft 64 and blade 71 carried thereon.

Importantly, therefore, the handheld blender 10 of the present invention provides two points of removable attachment, enabling the drive shaft assembly 14 and transmission shaft 30 therefore to be selectively removed and decoupled from the main body portion 12 and motor, as well as for a variety of processing tool attachments to be selectively coupled and decoupled from the drive shaft assembly 14. The particular configuration of the attachment mechanism (between the processing tool attachments and the drive shaft assembly) enables quick and reliable coupling and decoupling.

Figure 14:
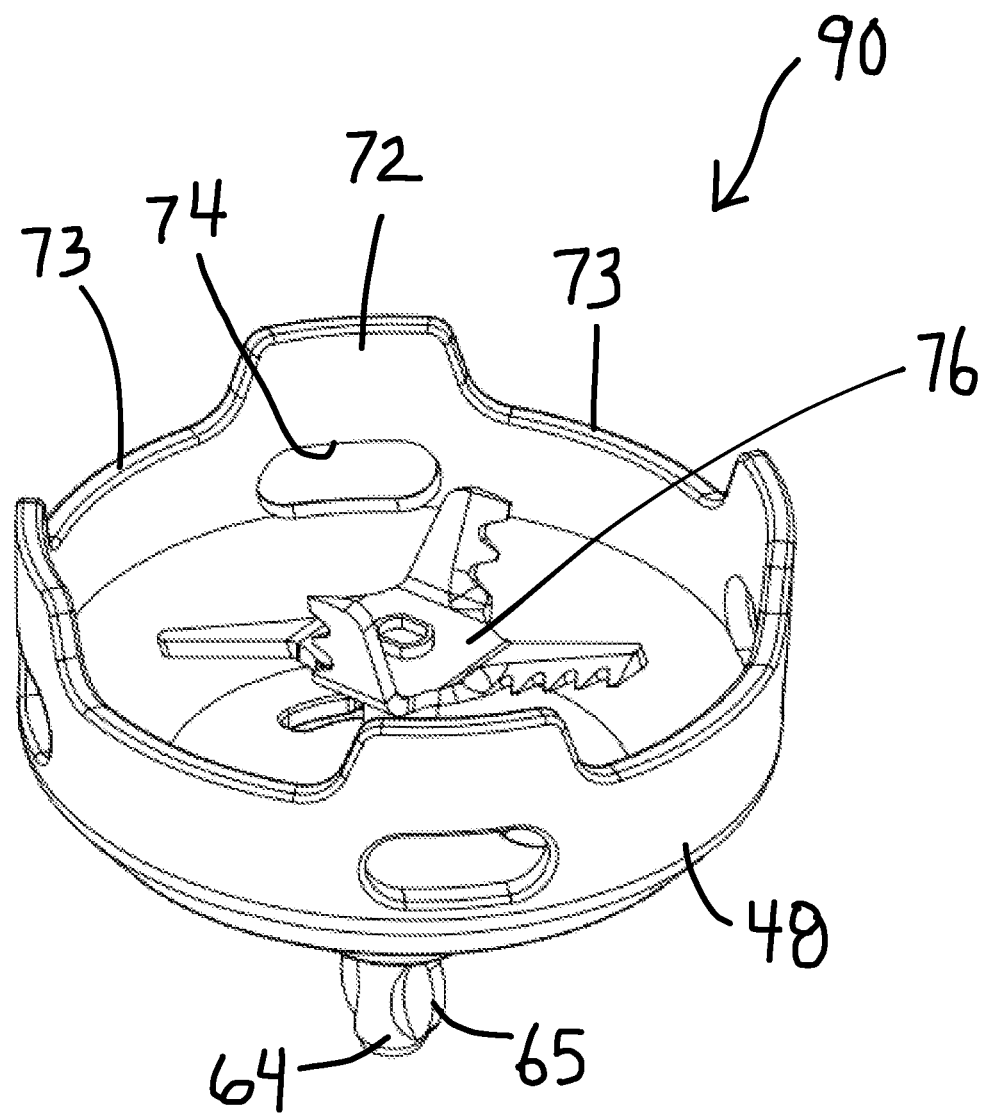
FIG. 14 is a bottom, perspective view of an ice crusher processing tool attachment, according to an embodiment of the present invention.
Figure 15:
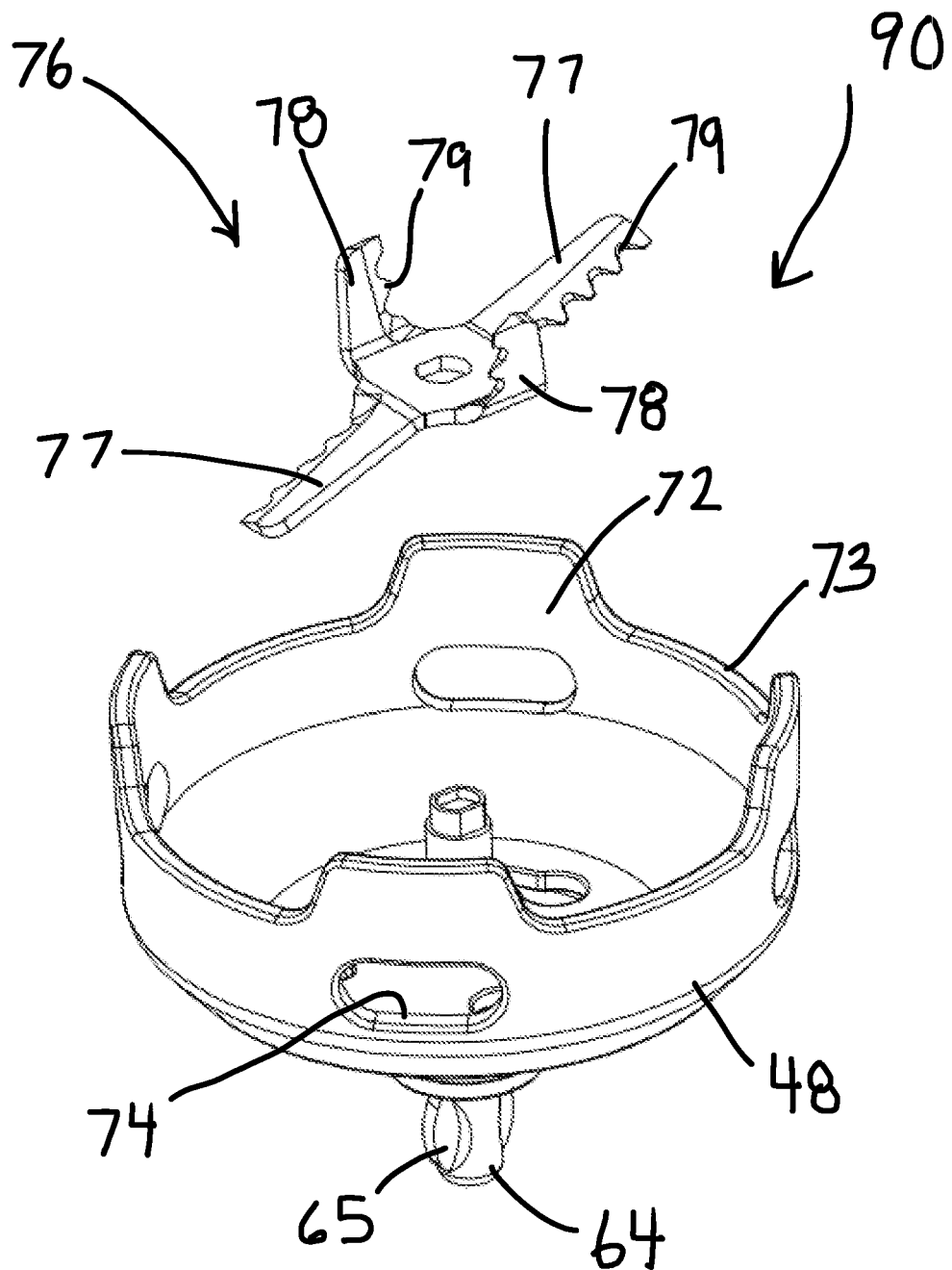
FIG. 15 is an exploded, bottom, perspective view of the ice crusher processing tool attachment of FIG. 14.
Figure 16:
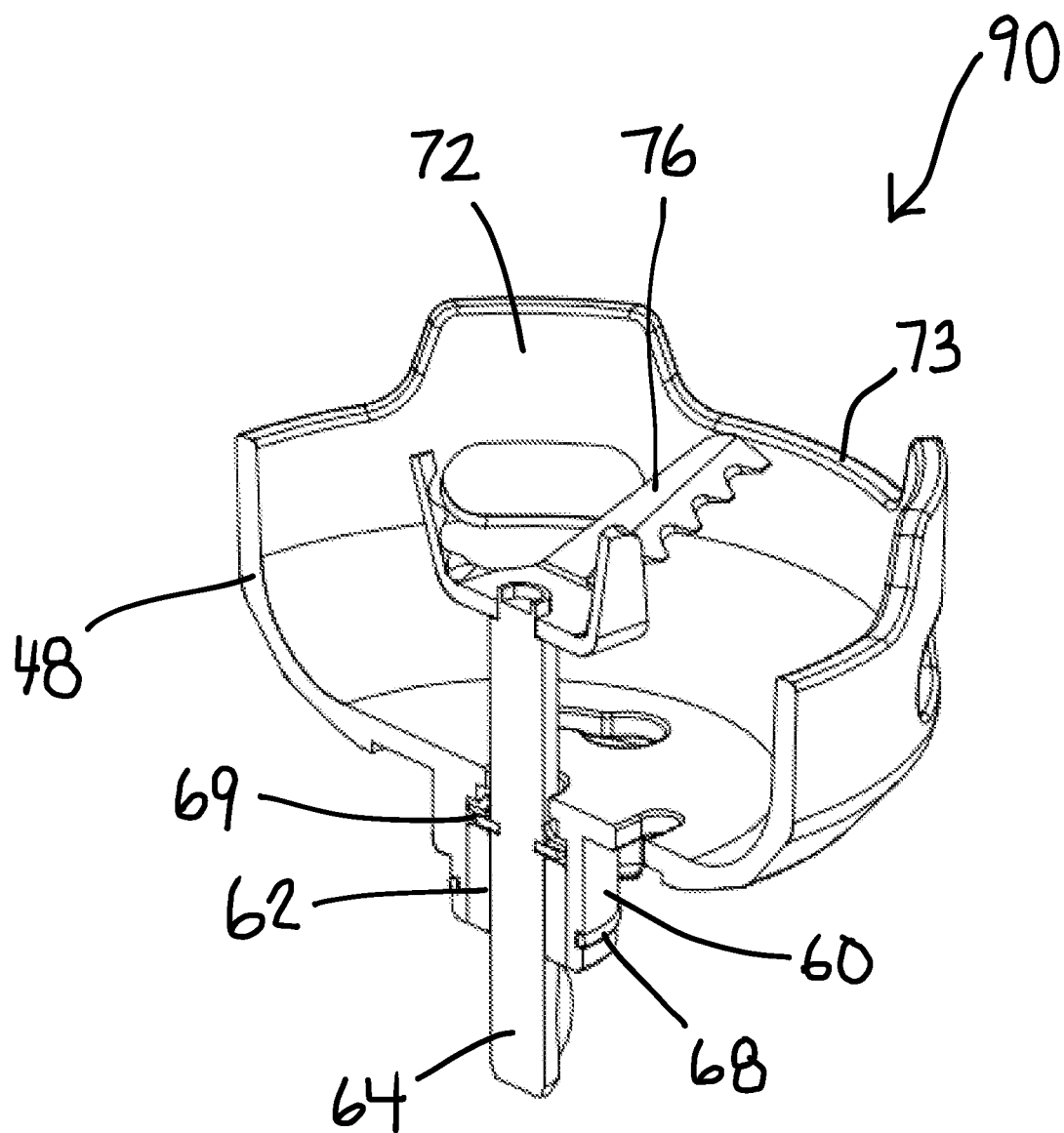
FIG. 16 is a bottom, perspective, cross-sectional view of the ice crusher processing tool attachment of FIG. 14.

With reference to FIGS. 14-16, the configuration of the ice crusher processing tool attachment 90 is shown. As indicated above, the configuration of the ice crusher processing tool attachment 90 is generally similar to that of the S-blade processing tool attachment 16, where like reference numbers indicate like parts. Rather than having an S-blade, however, the distal end of the shaft 64 carries an ice crusher blade 76 within the shroud/tool guard 48. As best shown in FIG. 15, the ice crusher blade 76 has a plurality of generally thick-walled arms each having a plurality of blunt teeth. For example, in an embodiment, the blade 76 may include opposing arms 77 oriented approximately 180 degrees from one another, and a pair of opposing arms 78 extending generally downwardly and positioned intermediate the arms 77. Each of the arms 77, 78 has a plurality of blunt teeth 79, as indicated above. The blunt blades with teeth are particularly suitable for crushing ice.

Figure 17:
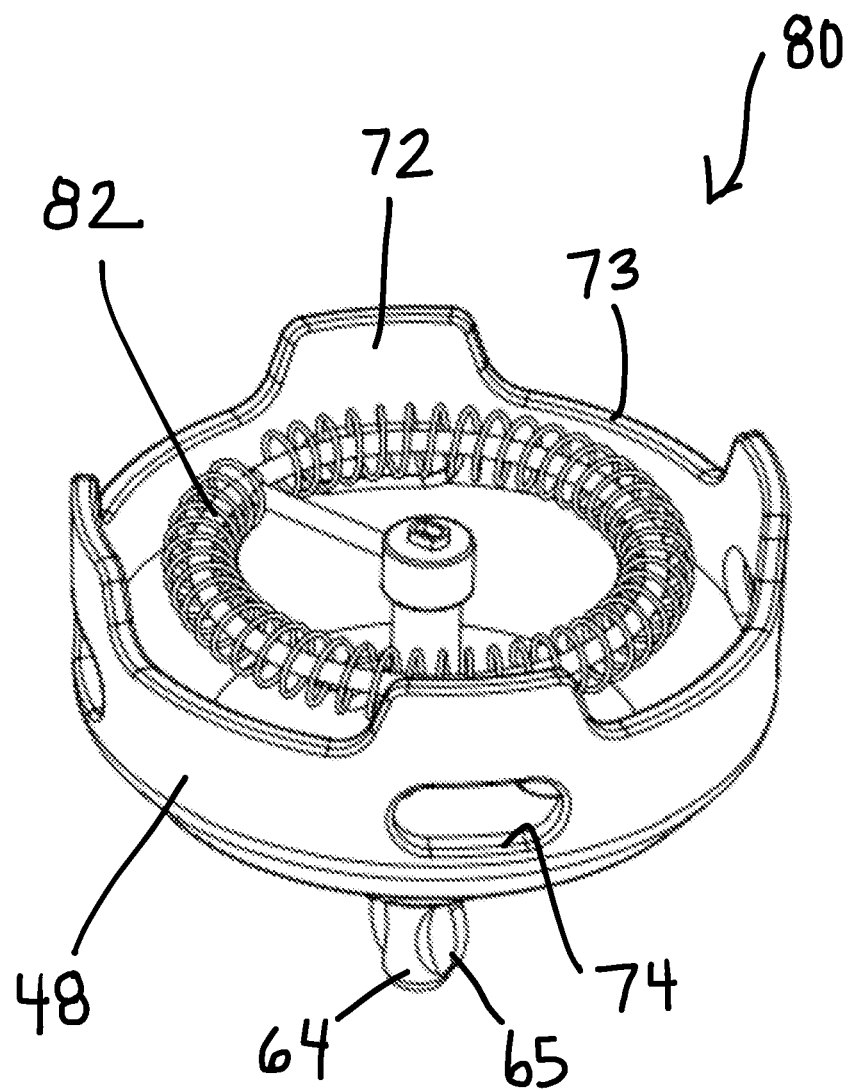
FIG. 17 is a bottom, perspective view of a frother processing tool attachment, according to an embodiment of the present invention.
Figure 18:
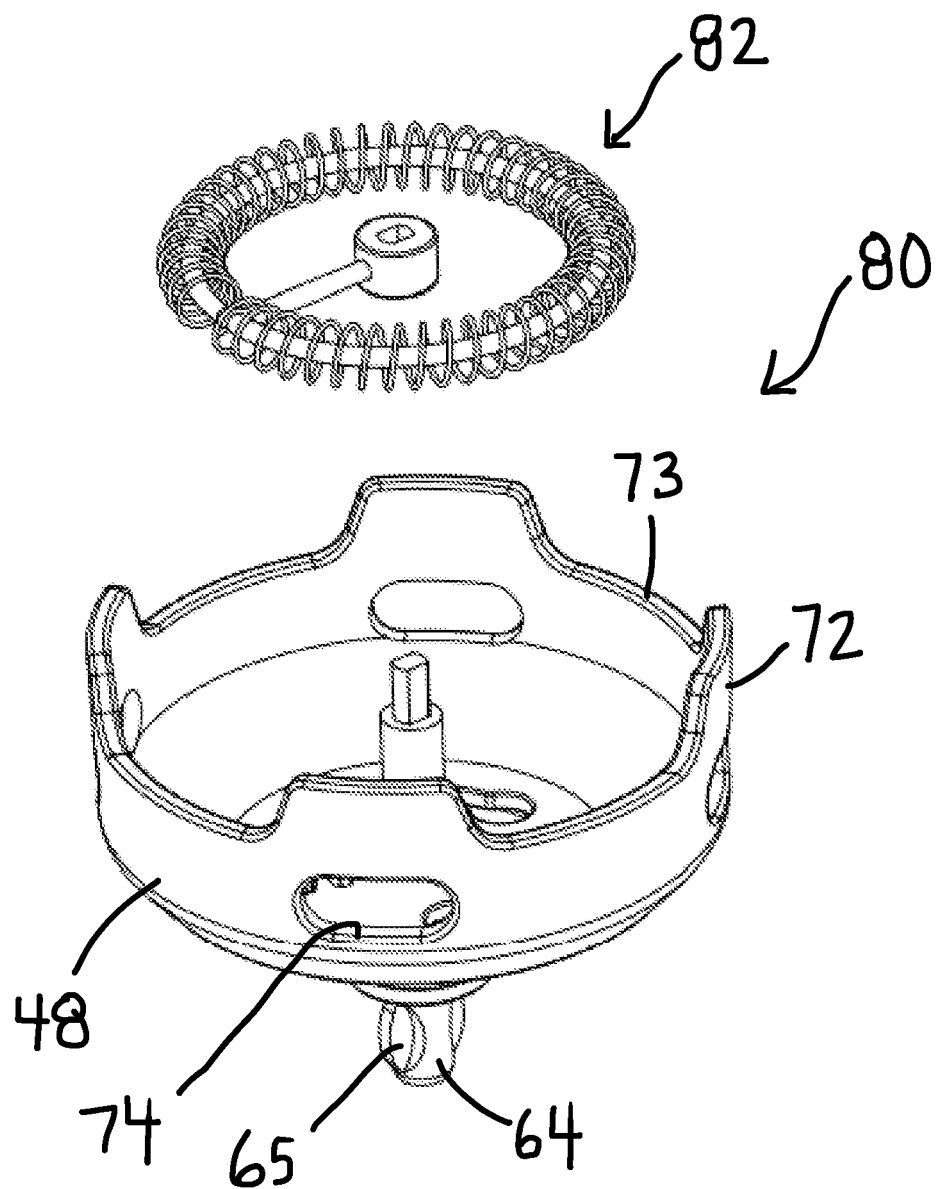
FIG. 18 is an exploded, bottom, perspective view of the frother processing tool attachment of FIG. 17.
Figure 19:
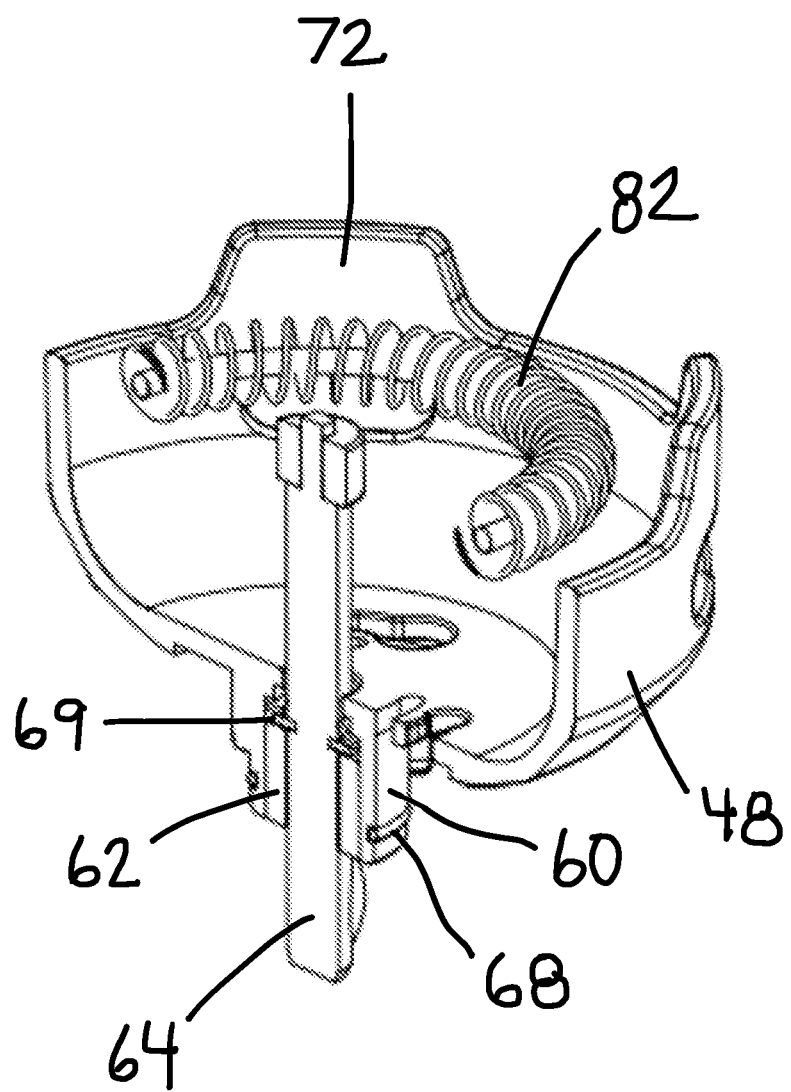
FIG. 19 is a bottom, perspective, cross-sectional view of the frother processing tool attachment of FIG. 17.

Referring now to FIGS. 17-19, the configuration of the frother processing tool attachment 80 is shown. As indicated above, the configuration of the frother processing tool attachment 80 is generally similar to that of the S-blade processing tool attachment 16, where like reference numbers indicate like parts. Rather than having an S-blade, however, the distal end of the shaft 64 carries a spiral wire 82 designed for frothing milk, whipping cream, and mixing drinks.

Figure 20:
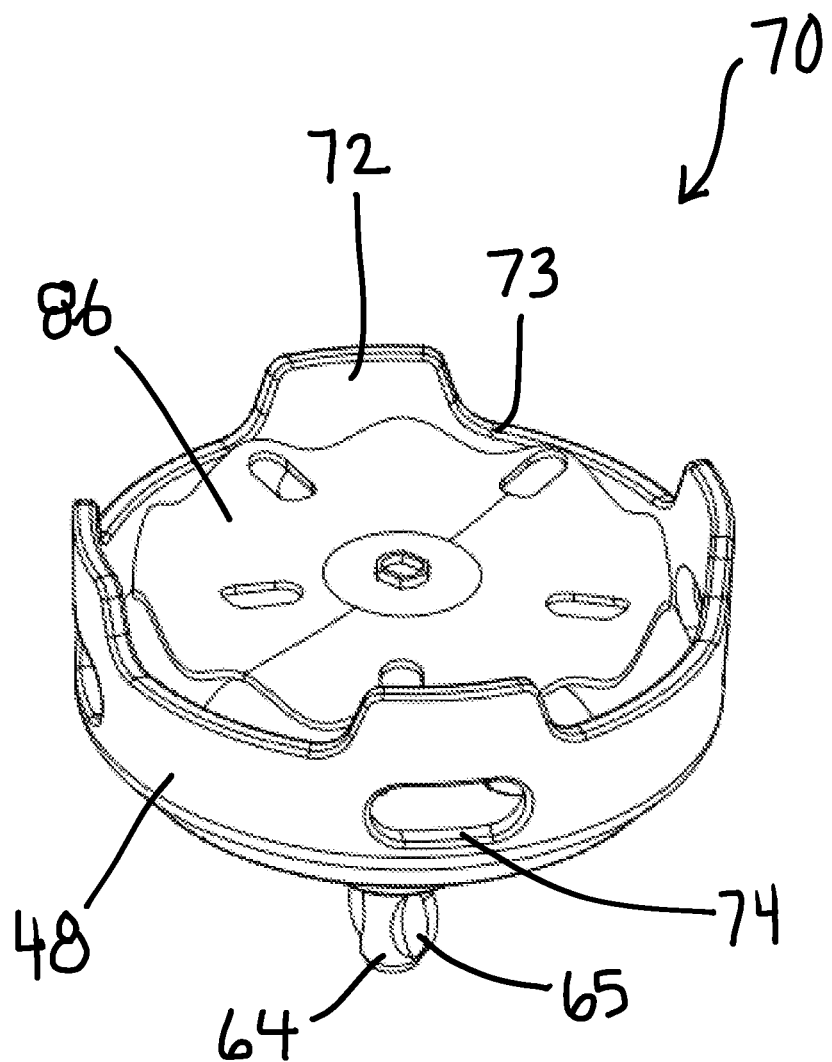
FIG. 20 is a bottom, perspective view of a drink disc processing tool attachment, according to an embodiment of the present invention.
Figure 21:
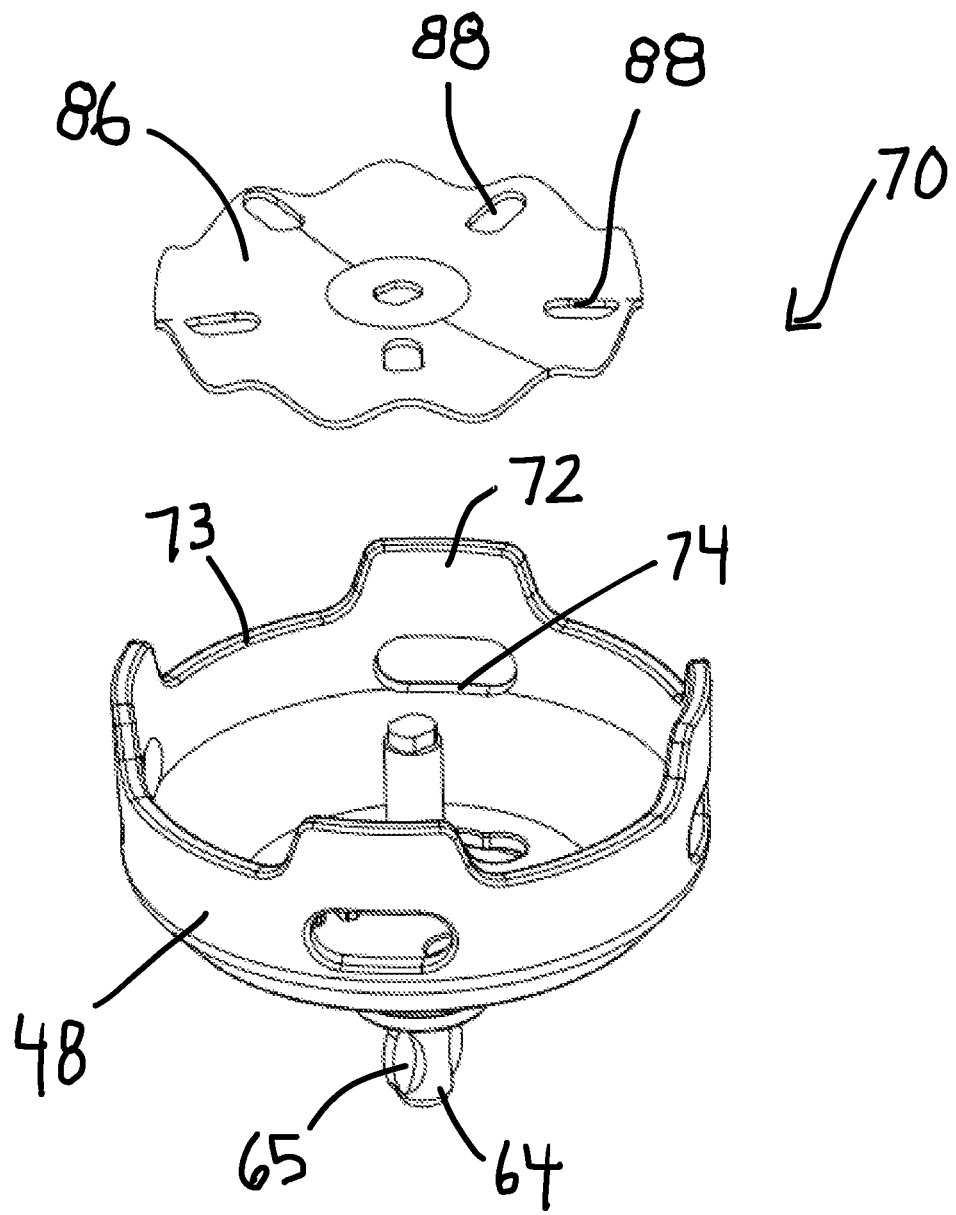
FIG. 21 is an exploded, bottom, perspective view of the drink disc processing tool attachment of FIG. 20.
Figure 22:
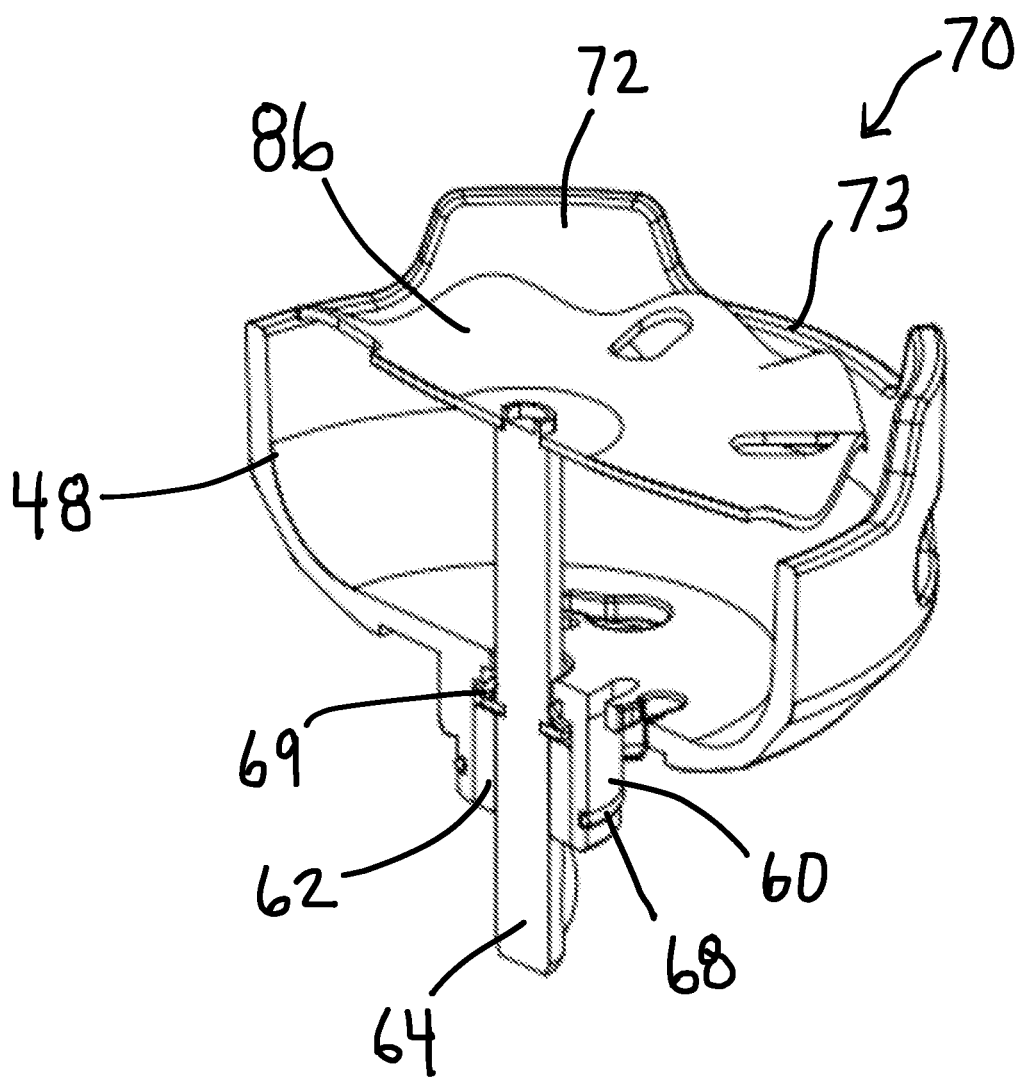
FIG. 22 is a bottom, perspective, cross-sectional view of the drink disc processing tool attachment of FIG. 20.
Figure 23:
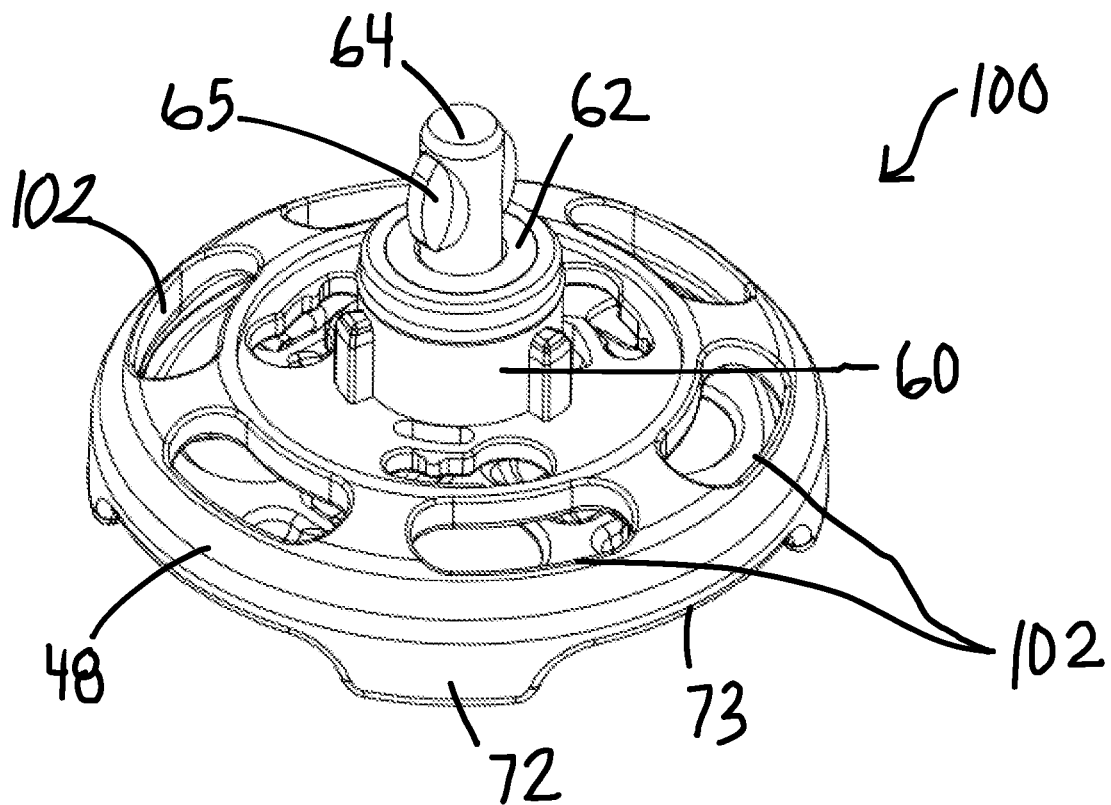
FIG. 23 is a top, perspective view of a potato masher processing tool attachment, according to an embodiment of the present invention.

Referring now to FIGS. 20-22, the configuration of the drink disc processing tool attachment 70 is shown. As indicated above, the configuration of the drink disc processing tool attachment 70 is generally similar to that of the S-blade processing tool attachment 16, where like reference numbers indicate like parts. Rather than having an S-blade, however, the distal end of the shaft 64 carries a waved disc 86 designed for frothing milk, whipping cream, and mixing drinks. As best shown in FIG. 21, the waved disc 86 has a plurality of undulations throughout the body of the disc, as well as a plurality of generally oval shaped apertures 88.

Figure 24:
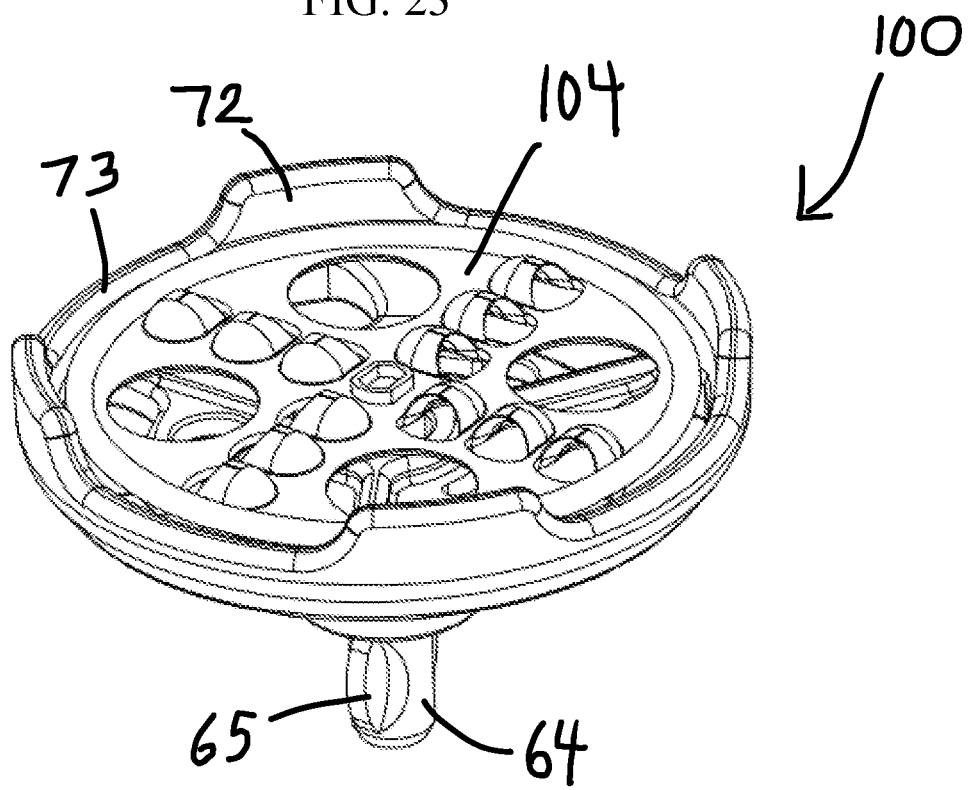
FIG. 24 is a bottom, perspective view of the potato masher processing tool attachment of FIG. 23.

Turning to FIGS. 23-28 the configuration of the potato masher processing tool attachment 100 is shown. As indicated above, the configuration of the potato masher processing tool attachment 100 is generally similar to that of the S-blade processing tool attachment 16, where like reference numbers indicate like parts. Notably, however, the blade guard 48 has a lower profile than the blade guard of the S-blade processing tool 16. Moreover, the top surface of the blade guard 48 has a plurality of apertures 102, the purpose of which will be hereinafter described. As shown in FIG. 24, the potato masher processing tool 100 further includes a rotary disc 104 coupled to the distal end of the drive shaft 64.

Figure 25:
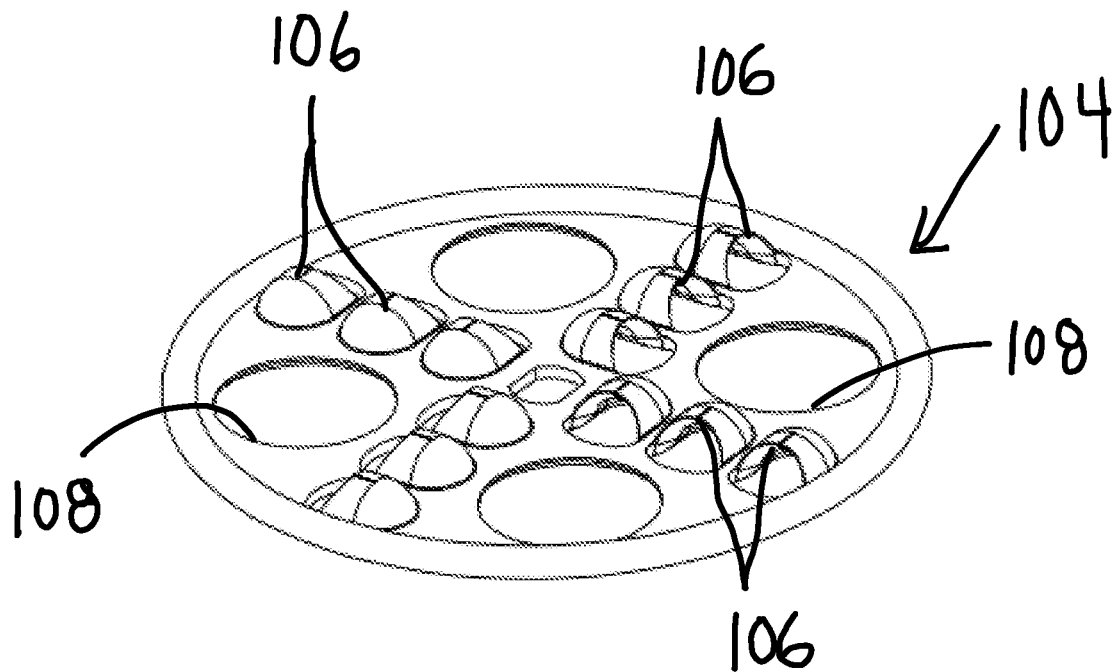
FIG. 25 is a perspective view of a rotary disc of the potato masher processing tool attachment of FIG. 23.
Figure 26:
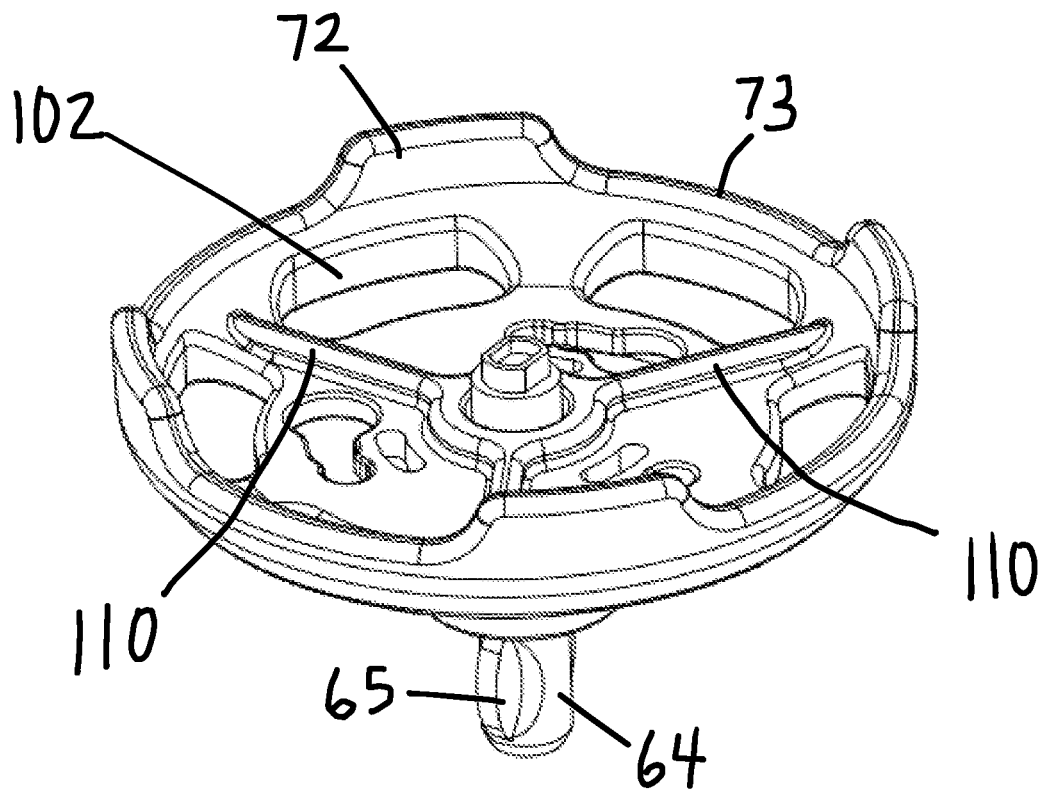
FIG. 26 is a bottom, perspective view of the potato masher processing tool attachment, shown with the rotary disc removed.
Figure 27:
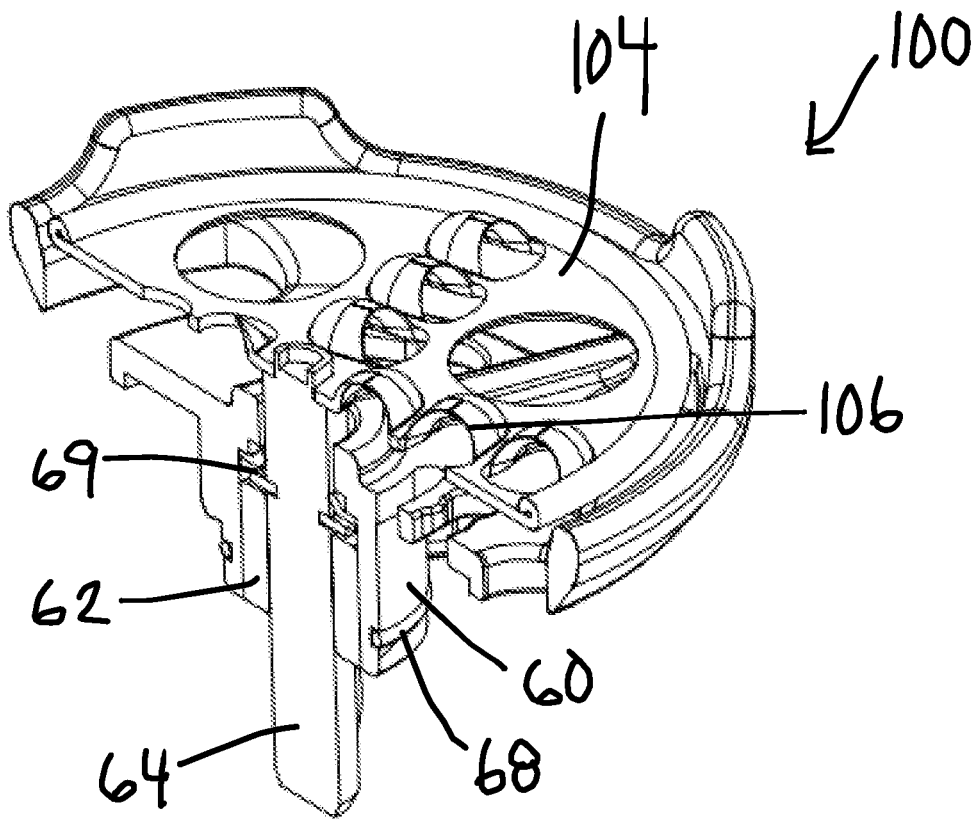
FIG. 27 is a bottom, perspective, cross-sectional view of the potato masher processing tool attachment of FIG. 23.
Figure 28:
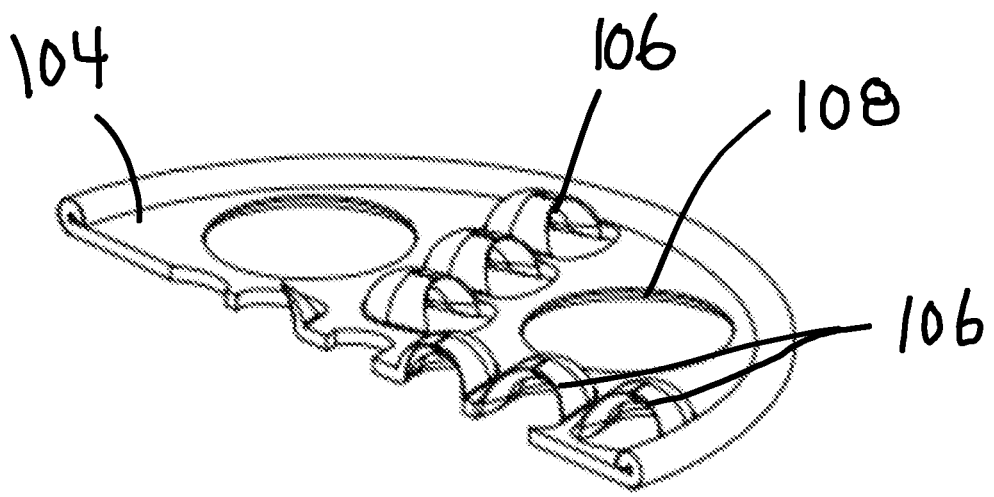
FIG. 28 is a perspective, cross-sectional view of the rotary disc of the potato masher processing tool attachment.

As best shown in FIG. 25, the rotary disc 104 includes a plurality of rows of convex shredding teeth 106 on the underside of the rotary disc 104, which emanate from the center of the disc. In an embodiment, the plurality of rows is four rows oriented ninety degrees from one another, although different arrangements are possible. Moreover, while FIG. 25 illustrates three shredding teeth 106 per row, more or fewer than three shredding teeth 106 per row may be employed. As further shown in FIG. 25, the shredding teeth 106 each include an associated aperture through the disc 104, which enables food to pass through the disc 104. In addition, the disc includes a plurality of holes 108 through the disc 104, which helps reduce friction and lower the working torque. As best shown in FIG. 26, the underside of the guard 48 includes a plurality of radial ribs 110. While three ribs are illustrated (oriented 120 degrees apart), more or fewer than three ribs may be present.

In use, the rotary disc 104 is driven by the drive shaft 64 and the disc 104 is pressed against boiled potatoes in the bottom of a pot. As the disc 104 rotates, the convex shredding teeth 106 finely shred the potatoes. At high speeds (e.g., above 100 rpm), the shredded potatoes are very creamy and pass through the holes in the disc 104 and are extruded through the openings 102 in the guard 48. Importantly, the ribs 110 on the underside of the guard 48 sweep the shredded, creamy potatoes off of the rotary disc 104 and towards the openings 102. Continued downward pressure during operation of the handheld blender 10 helps extrude the mashed potatoes through the guard 48 during operation. Importantly, the potato masher attachment allows for mashing of boiled potatoes by direct drive without requiring gearing down.

The various processing tool attachments disclosed herein therefore allow for a wide range of food processing functions to be carried out using a single handheld blender device 10. As the processing tool attachments are easily removable from both the main body 12 and the drive shaft assembly 14, such attachments can be easily cleaned. In addition, the cost of production of such attachments is less than if each attachment required a dedicated drive shaft for coupling directly to the motor output.

Figure 29:
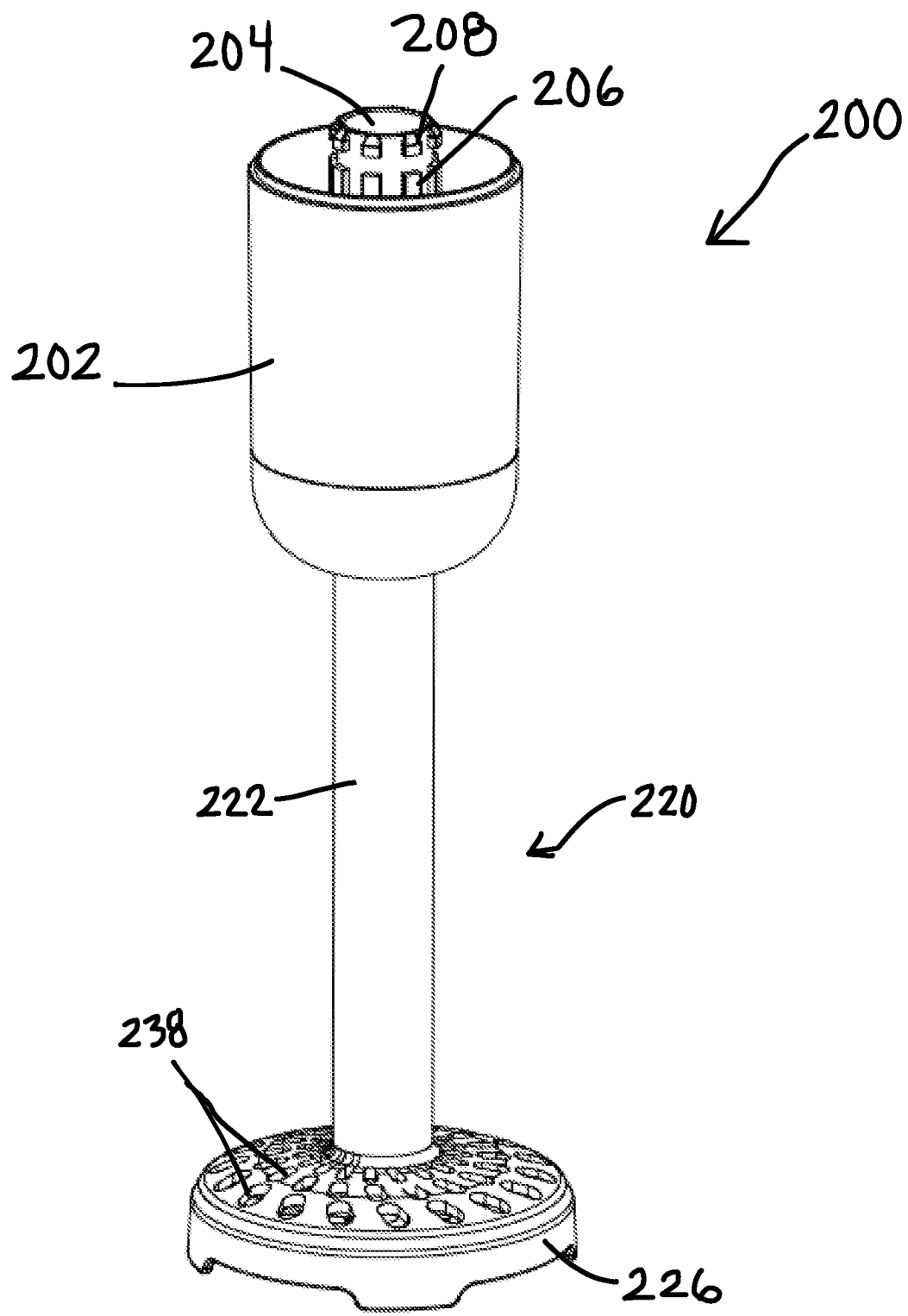
FIG. 29 is a perspective view of a potato masher assembly for a handheld blender, according to another embodiment of the present invention.

Turning now to FIGS. 29-33, a potato masher assembly 200 according to another embodiment of the present invention is illustrated. As shown in FIG. 29, the potato masher assembly 200 includes a gearbox 202 configured for releasable attachment to main body 12 of a handheld blender, and a potato masher attachment 220 releasably connected to the gearbox 202. The gearbox 202 has a hollow housing member 204 similar to the elongate housing member 24 shown in FIGS. 2 and 3. In particular, the hollowing housing member includes a plurality of parallel ribs 206 and protrusions 208 on an external surface thereof. The ribs 206 and protrusions 208 are configured to be received in corresponding grooves in the main body portion 12, for releasably connecting the potato masher assembly 200 to the main body portion 12. With specific reference to FIG. 31, the gearbox 202 further includes a drive or transmission shaft 210 extending through the hollow housing member 204, and having a proximal end 212 configured for connection to a drive shaft of the motor in a manner so as to be rotationally driven thereby. In an embodiment, the drive shaft of the motor and the transmission shaft 30 may be interconnected in any of a variety of conventional ways such as, for example, that disclosed in U.S. Pat. No. 7,172,334. As further shown therein, the gearbox 202 includes a gear mechanism 214 having a plurality of gears, and a coupling member 216 for drivingly connecting the transmission shaft 212 to a drive shaft of a potato masher. As also shown therein, the gearbox 202, at its distal end, has a plurality of ribs 218, the purpose of which is described hereinafter.

Figure 30:
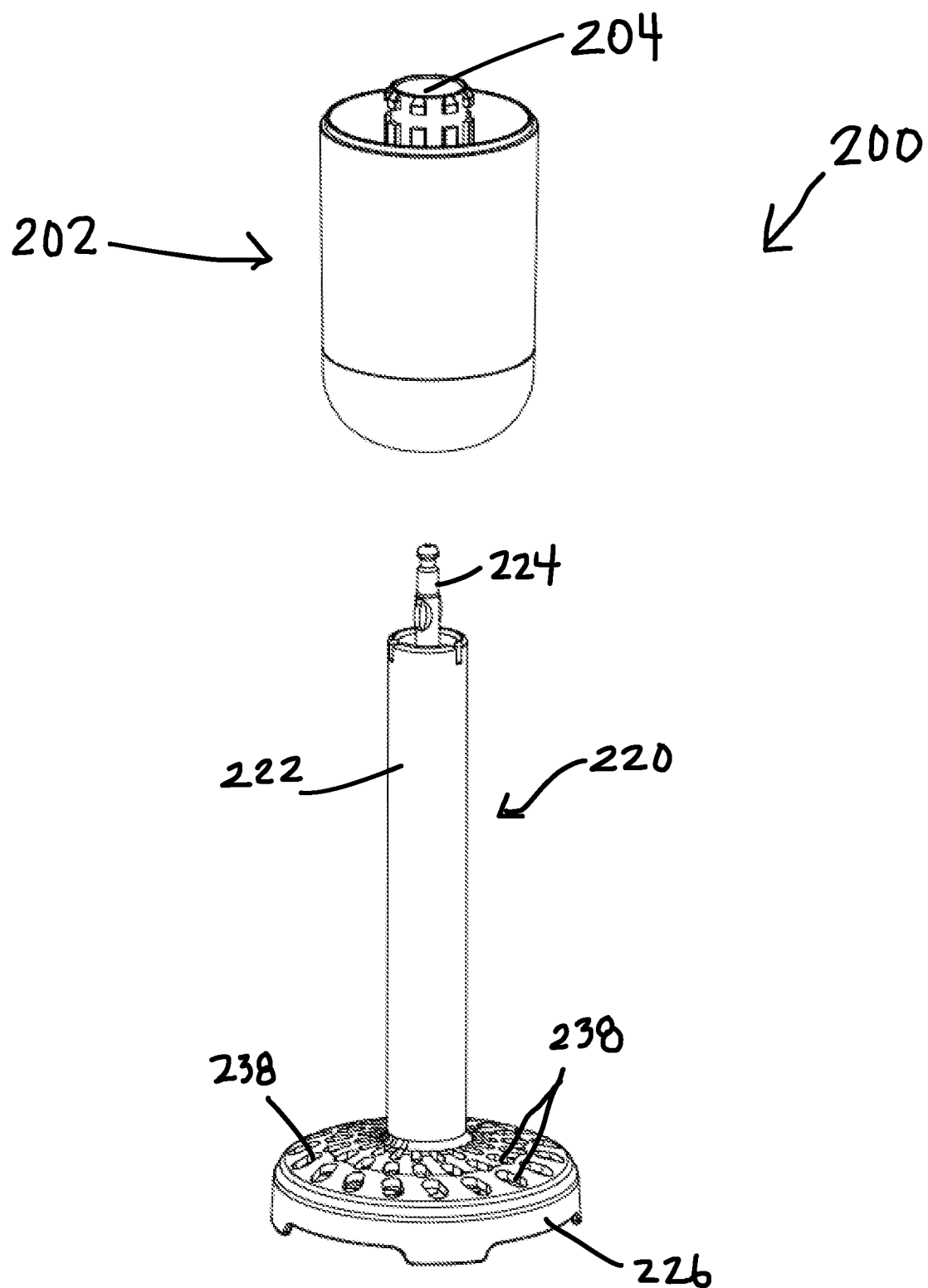
FIG. 30 is a perspective view of the potato masher assembly showing a potato masher attachment detached from a gear box.
Figure 31:
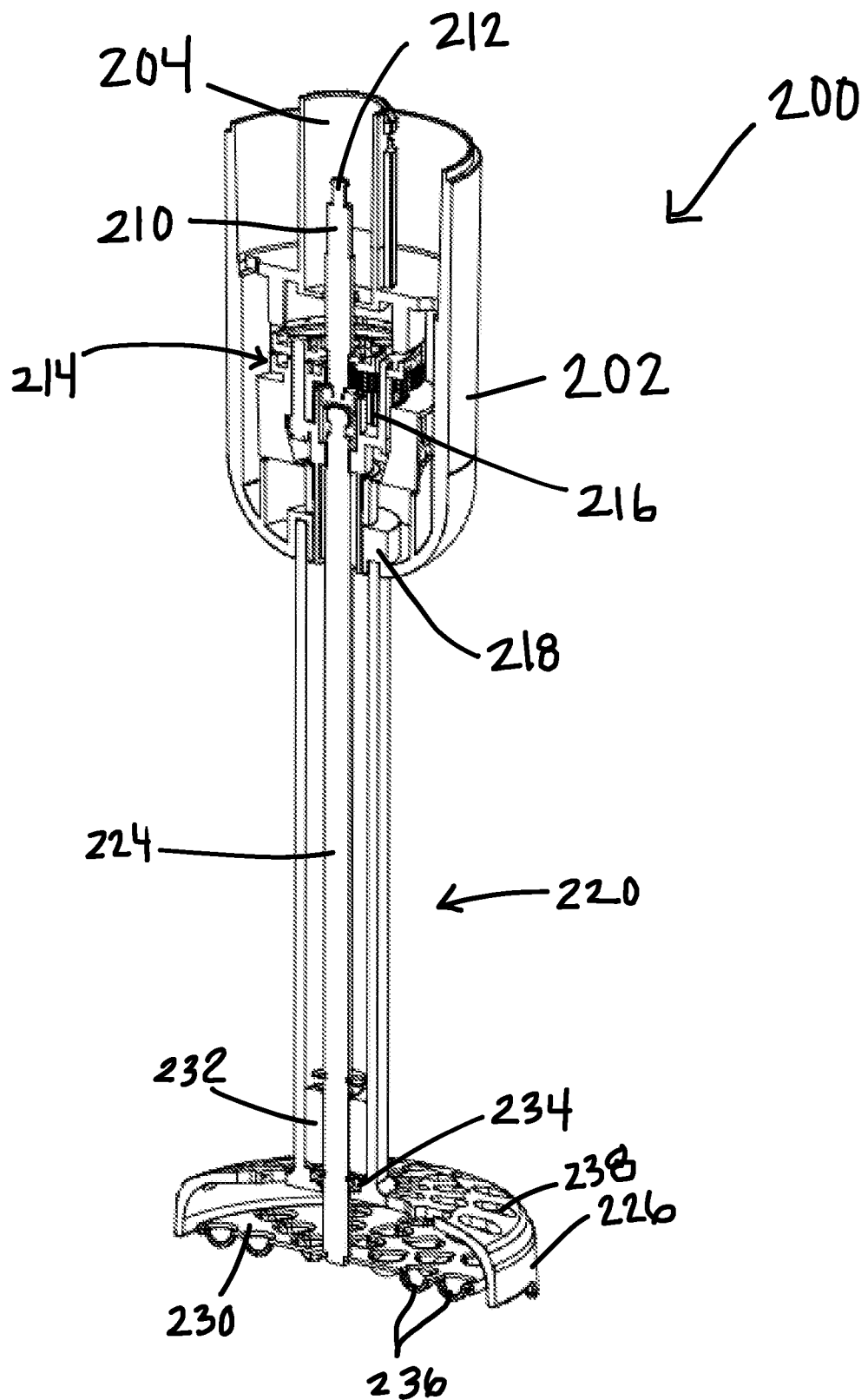
FIG. 31 is a perspective, cross-sectional view of the potato masher assembly of FIG. 29.
Figure 32:
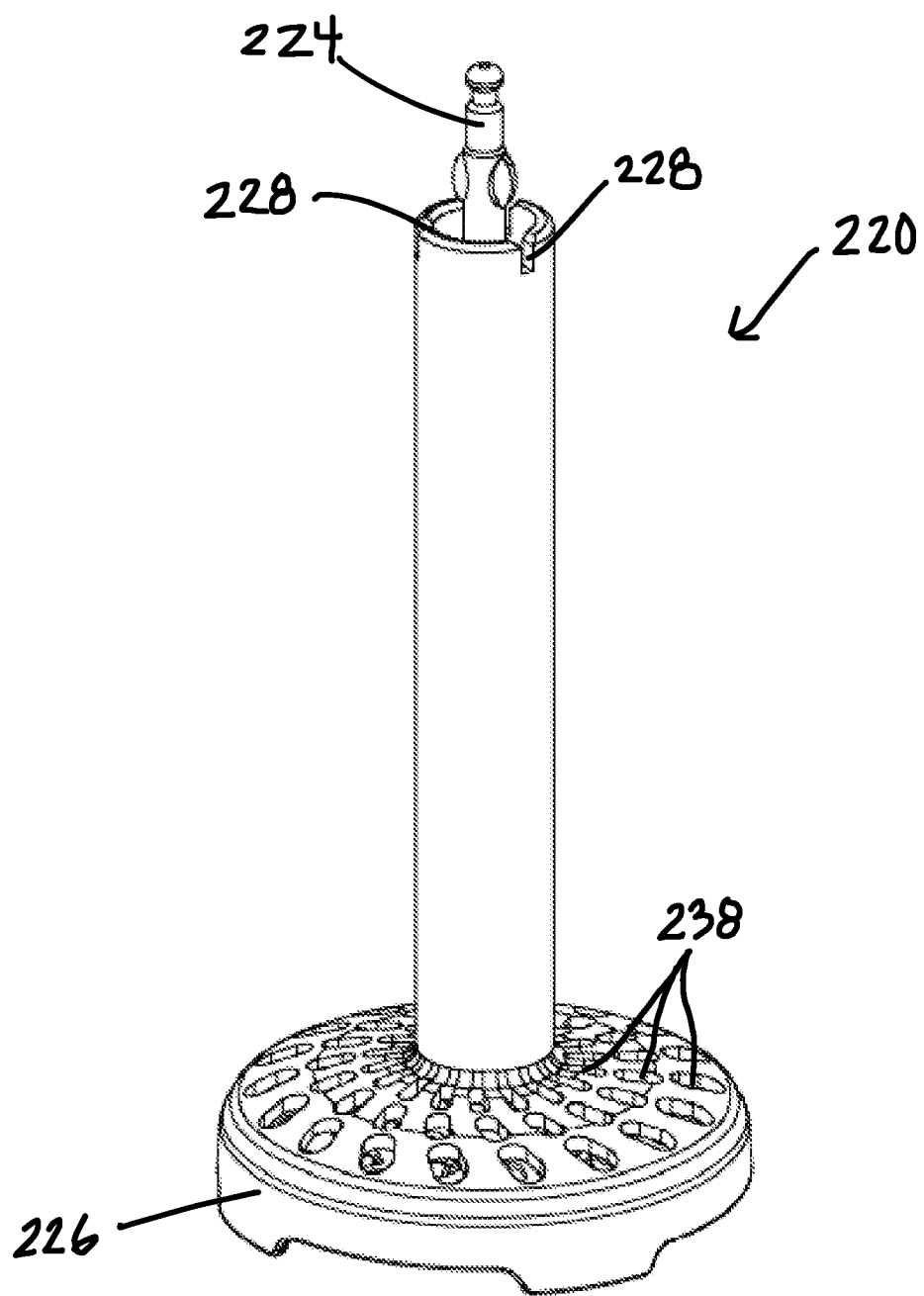
FIG. 32 is a top, perspective view of the potato masher attachment of the potato masher assembly.
Figure 33:
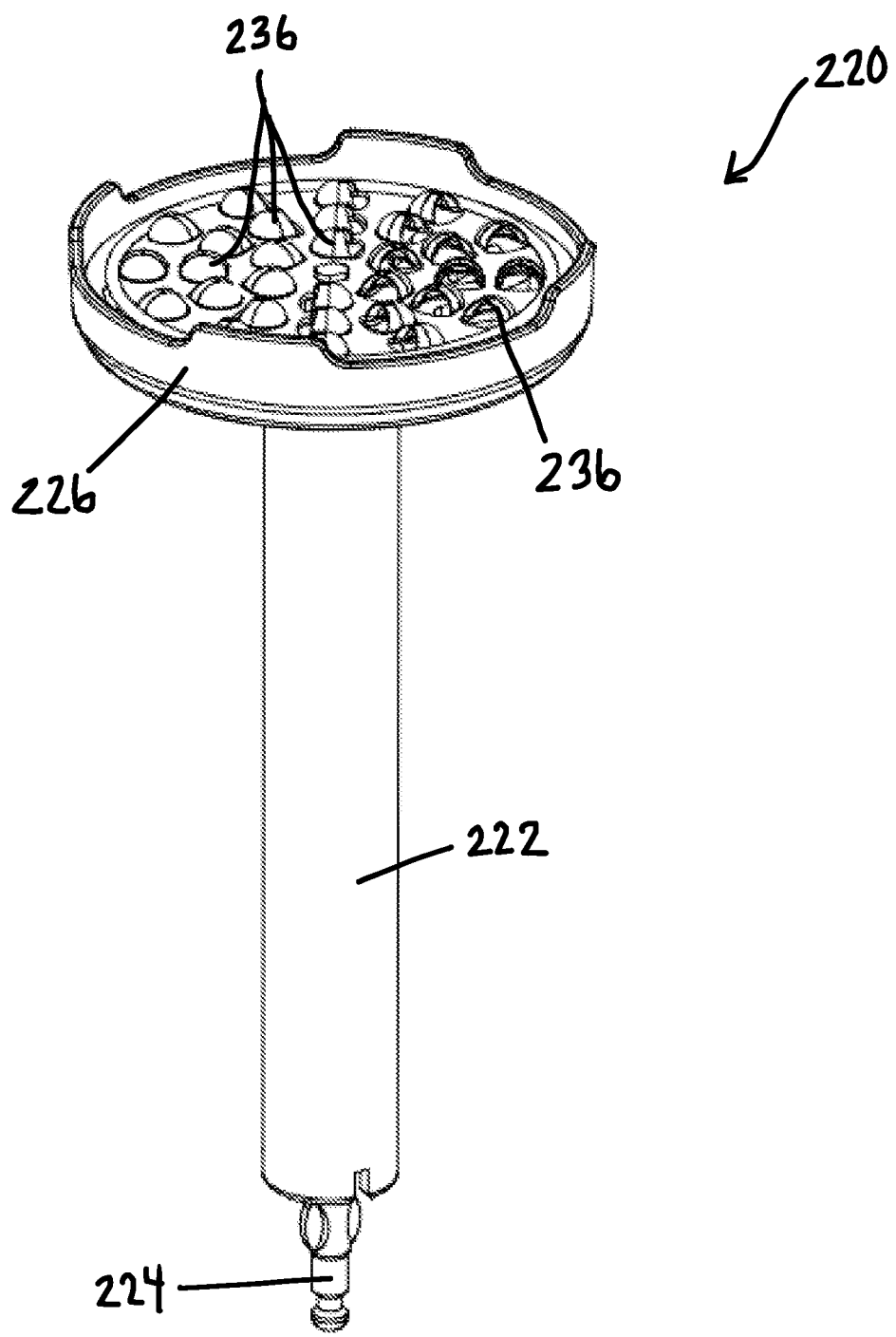
FIG. 33 is a bottom, perspective view of the potato masher attachment of the potato masher assembly.

As best shown in FIGS. 30, 32 and 33, the potato masher attachment 220 includes a hollow cylindrical housing 222 having a drive shaft 224 housed therein. The drive shaft 224 protrudes from the proximal end of the housing 222 and is configured for driving connection with the coupling member 216 of the gearbox 202. In an embodiment, the gearbox 202 may include a plurality of flexible convex ribs that interface with the groove adjacent to the proximal end of the drive shaft 224 to hold the potato masher attachment 220. A blade guard 226 is integrally formed with or otherwise connected to the distal end of the housing 222, and is similar in configuration to the potato masher processing tool described above. The distal end of the drive shaft 224 extends into the blade guard 226 and carries, at the distal end, a shredding disc 230 similar in configuration to disc 104 disclosed above. A bushing 232 within the housing 222 at the distal end functions to stabilize and locate the shaft 224. A seal cap 234 prevents incursion of liquid into the housing 222. As best shown in FIG. 32, the proximal end of the cylindrical housing 222 includes a plurality of slots 228 that are configured to receive the ribs 218 of the gearbox 202 to prevent relative rotation of the gearbox 202 and housing 222 when the potato masher attachment is coupled to the gearbox 202.

In use, the potato masher attachment is connected to the distal end of the gearbox 202 in the manner described above, and the gearbox is connected to the main body 12 of a handheld blender, and the motor output there, in the manner described above. Upon actuation of the motor, the rotational output thereof is transmitted to the shaft 210 of the gearbox 202, and to the shaft 224 of the potato masher attachment 220, which rotates the shredding disc 230 within the blade guard 226. The shredding disc 230 can then be pressed against boiled potatoes, which shreds the potatoes using the array of convex shredding elements 236 thereof. The shredded potato material then passes beyond the shredding disc 230, and is extruded through the blade guard 226 via the array of apertures 238 therethrough.

Figure 34:
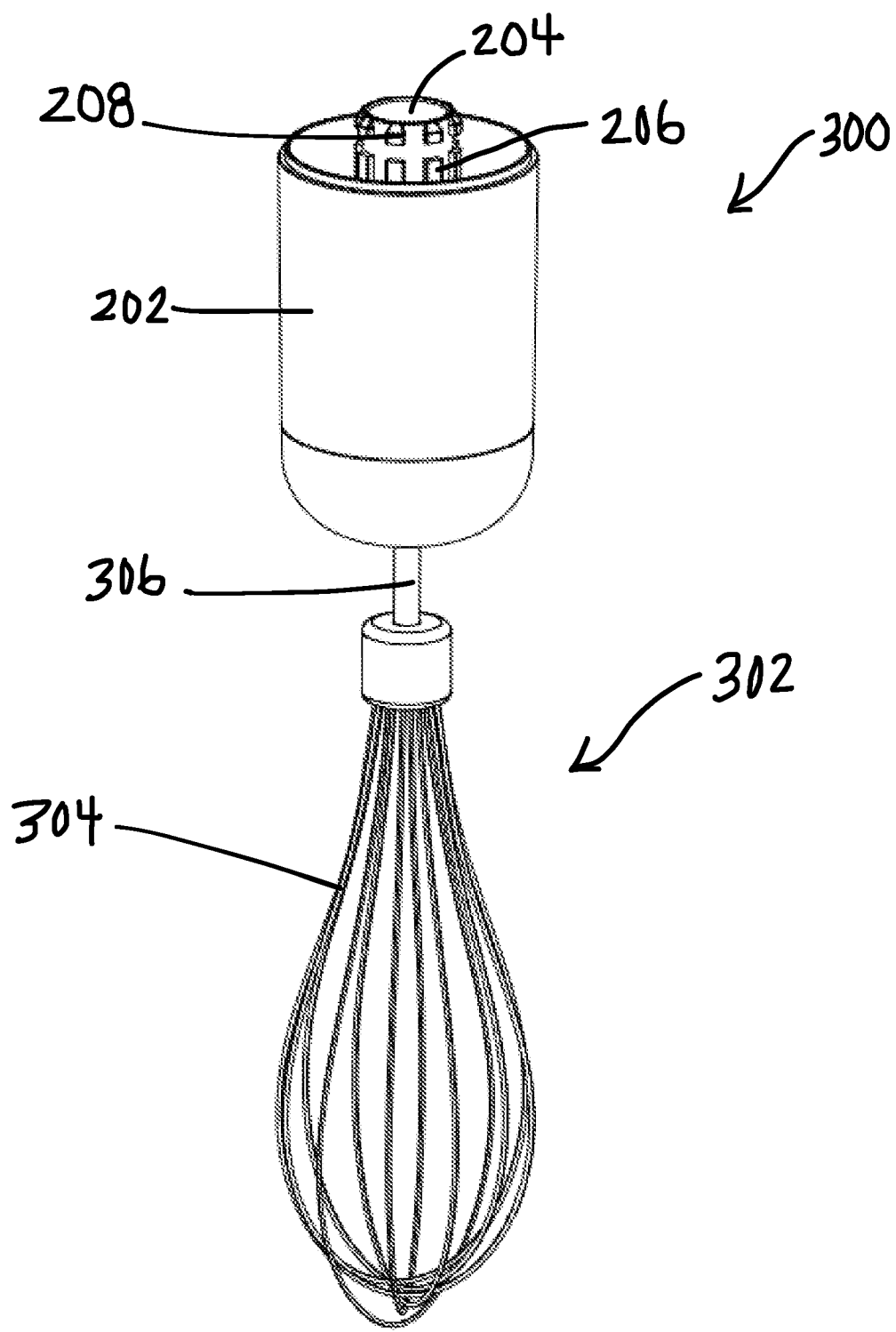
FIG. 34 is a perspective view of a whisk assembly for a handheld blender, according to another embodiment of the present invention.
Figure 35:
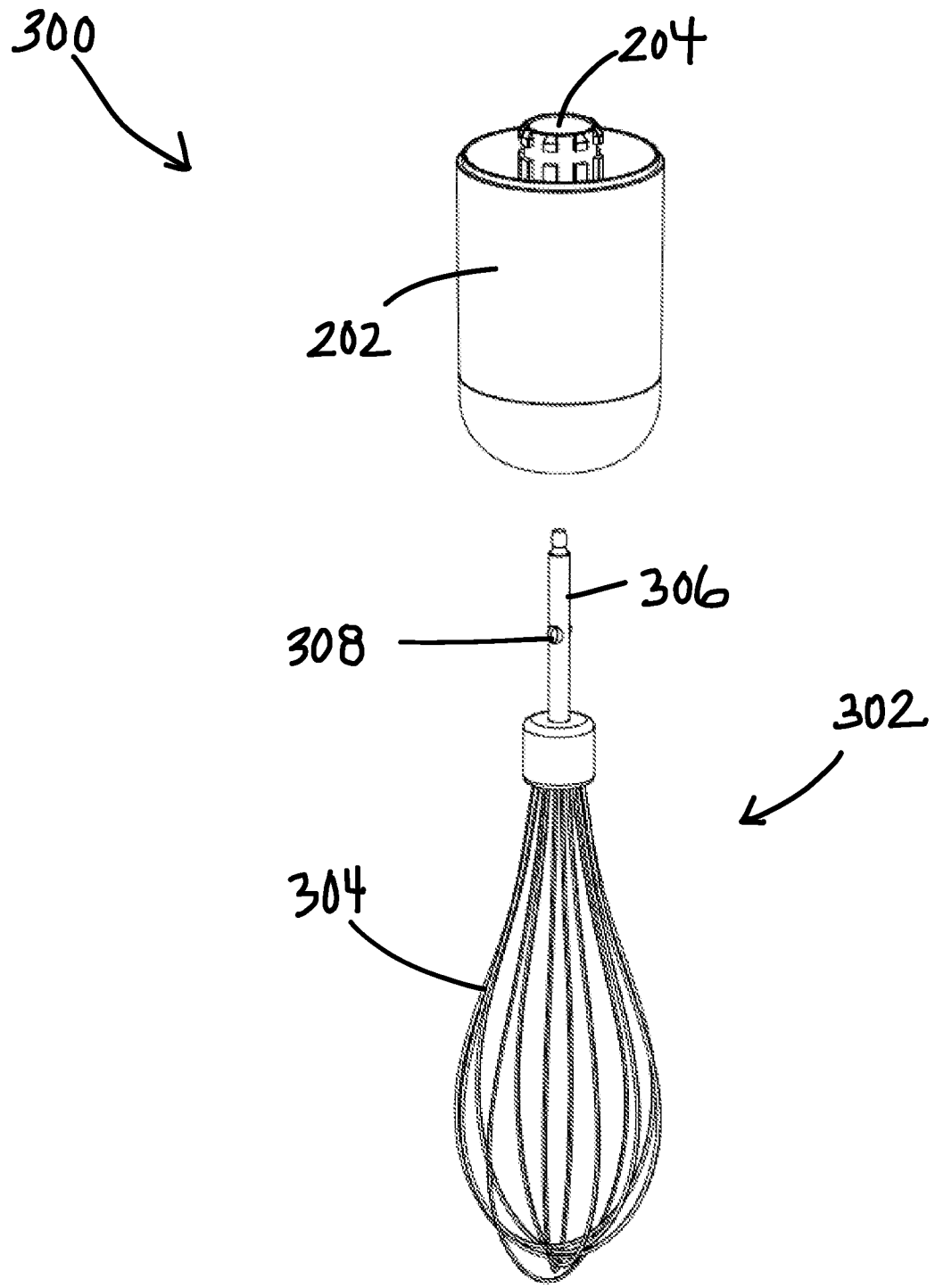
FIG. 35 is a perspective view of the whisk assembly showing a whisk attachment detached from a gear box.
Figure 36:
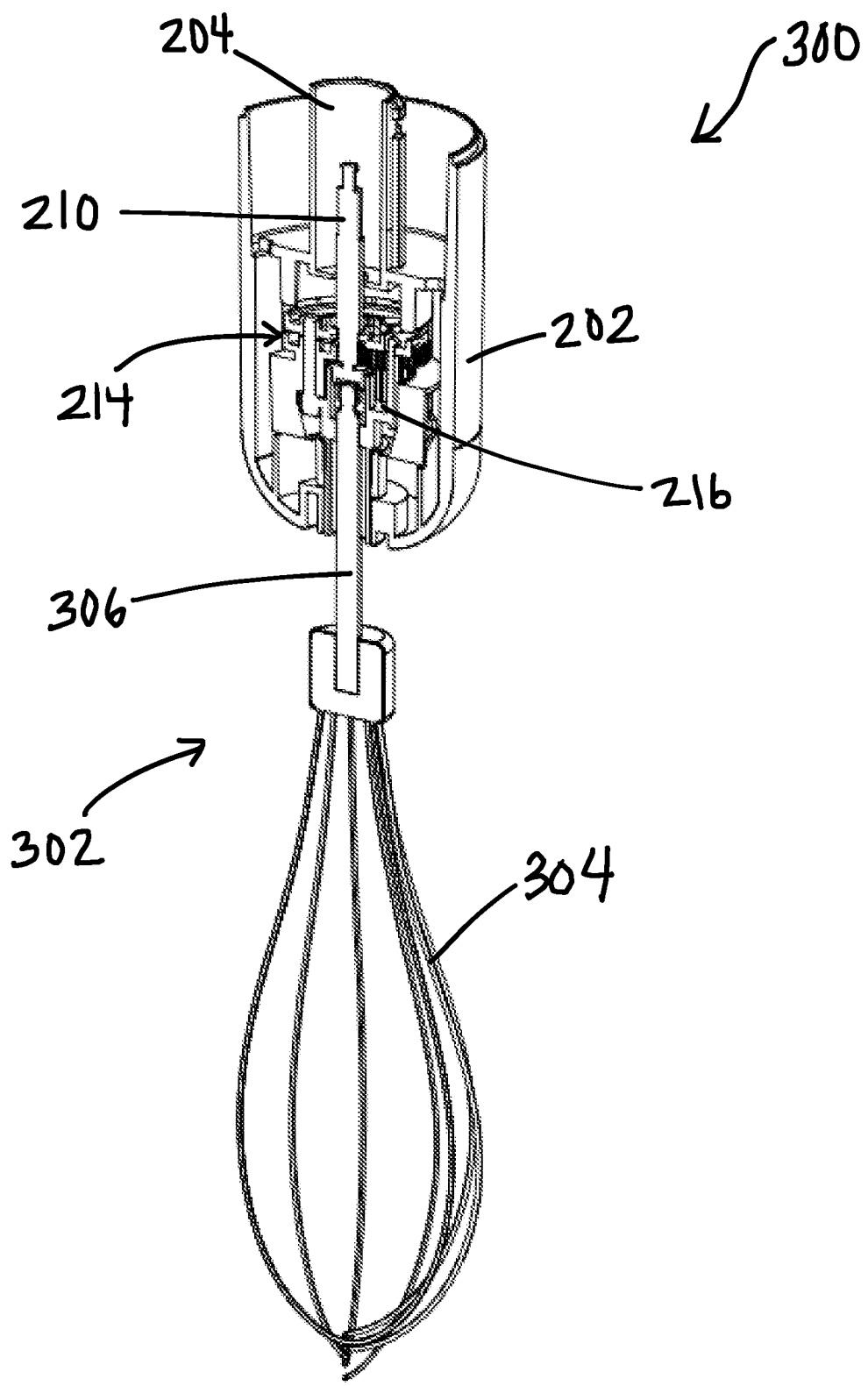
FIG. 36 is a perspective, cross-sectional view of the whisk assembly of FIG. 34.

Turning finally to FIGS. 34-36, a whisk assembly 300 according to an embodiment of the present invention is illustrated. The whisk assembly 300 is similar in configuration to the potato masher assembly 200, where like reference numerals indicate like parts. In particular, the whisk assembly 300 includes gearbox 202 (as disclosed above). The whisk assembly 300 further includes a whisk attachment 302 having a whisk 304 and a drive shaft 306. The drive shaft 306 includes a pair of opposed paddle elements 308 that are received in the coupling member 216 of the gearbox 202. Similar to the potato masher attachment, the gearbox 202 may include a plurality of flexible convex ribs that interface with the groove adjacent to the proximal end of the drive shaft 306 to hold the whisk attachment 302.

Importantly, the use of a common gearbox 202 enables multiple different processing attachments, namely, a potato masher implement and a whisk implement, to be selectively used with the handheld blender.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A handheld food blender, comprising:
a main body configured to house a motor;
a drive shaft assembly removably connected to the main body, the drive shaft assembly having a transmission shaft configured to be driven by the motor, the drive shaft assembly including an elongate housing and a plurality of lugs at a distal end of the elongate housing; and
a processing tool attachment removably connected to a distal end of the drive shaft assembly, the processing tool attachment having a food processing implement and a drive shaft, the processing tool attachment further including a plurality of keyhole openings corresponding to the plurality of lugs of the drive shaft assembly, the plurality of keyhole openings including a clearance portion and a retaining portion and being configured to receive the plurality of lugs of the elongate housing;
wherein the transmission shaft is configured to transmit a rotational output of the motor to the drive shaft of the processing tool attachment to rotate the food processing implement;
wherein the plurality of lugs are configured for removable connection to the processing tool attachment; and
wherein the at least one of the plurality of keyhole openings includes at least one protrusion forming a reduced width section of the keyhole opening adjacent to the retaining portion.

2. The handheld food blender of claim 1, wherein:
the plurality of lugs each include a neck portion and enlarged head portion.

3. The handheld food blender of claim 1, wherein:
the processing tool attachment includes a shroud within which the food processing implement is housed; and
wherein the plurality of keyhole openings are formed in the shroud.

4. The handheld food blender of claim 3, wherein:
the shroud includes at least one relief opening adjacent to the at least one protrusion of the keyhole opening, the at least one relief opening being configured to allow deformation of the keyhole opening to permit at least one of the lugs to pass from the clearance portion, beyond the at least one protrusion, and into the retaining portion.

5. The handheld food blender of claim 4, wherein:
the at least one protrusion is configured to resist movement of the at least one of the lugs from the retaining portion of the keyhole opening to the clearance portion of the keyhole opening.

6. The handheld food blender of claim 5, wherein:
each of the keyhole openings includes the clearance portion, the retaining portion, and the at least one protrusion.

7. The handheld food blender of claim 1, wherein:
the food processing implement is one of an S-blade, a wave disc, an ice crushing blade and a spiral wire.

8. The handheld food blender of claim 1, wherein:
the processing tool attachment includes a shroud within which the food processing implement is housed, the shroud including a plurality of through apertures;
wherein the food processing implement includes a rotary shredding disc connected to the drive shaft; and
wherein the rotary shredding disc is configured to shred a food item for extrusion through the through apertures in the shroud.

9. The handheld food blender of claim 8, wherein:
an underside of the shroud includes a plurality of radially extending ribs configured to scrape the shredded food item from a backside of the rotary shredding disc.

* * * * *